United States Patent [19]

Dyksterhouse et al.

[11] Patent Number: 4,943,472

[45] Date of Patent: Jul. 24, 1990

[54] IMPROVED PREIMPREGNATED MATERIAL COMPRISING A PARTICULATE THERMOSETTING RESIN SUITABLE FOR USE IN THE FORMATION OF A SUBSTANTIALLY VOID-FREE FIBER-REINFORCED COMPOSITE ARTICLE

[75] Inventors: Robert Dyksterhouse; Joel A. Dyksterhouse, both of Marathon, Fla.; Alan C. Handermann, Matthews, N.C.; Edward D. Western, Fort Mill, S.C.

[73] Assignee: BASF Aktiengesellschaft, Fed. Rep. of Germany

[21] Appl. No.: 426,443

[22] Filed: Oct. 25, 1989

Related U.S. Application Data

[60] Division of Ser. No. 157,836, Mar. 3, 1988, Pat. No. 4,919,739, which is a continuation-in-part of Ser. No. 928,917, Nov. 7, 1986, abandoned.

[51] Int. Cl.$^5$ .......................... B32B 5/08; B32B 5/26; B32B 27/06; B32B 27.12
[52] U.S. Cl. .................... 428/240; 156/307.4; 156/307.5; 156/307.7; 428/112; 428/113; 428/255; 428/272; 428/273; 428/288; 428/294; 428/327; 428/338; 428/339; 428/408; 428/473.5; 428/542.8; 428/698; 428/902
[58] Field of Search ............... 428/240, 272, 273, 288, 428/294, 327, 338, 339, 408, 902

[56] References Cited

U.S. PATENT DOCUMENTS

| | | | |
|---|---|---|---|
| 2,596,162 | 5/1952 | Muskat . | |
| 2,609,319 | 9/1952 | Boge . | |
| 3,116,192 | 12/1963 | Eilerman . | |
| 3,334,071 | 8/1967 | Reeder . | |
| 3,779,854 | 12/1973 | Durkert et al. | 156/306 |
| 3,970,495 | 7/1976 | Ashton | 156/175 |
| 4,067,845 | 10/1978 | Epel et al. | 525/19 |
| 4,238,542 | 12/1980 | Burley | 428/58 |
| 4,259,379 | 3/1981 | Britton et al. | 427/356 |
| 4,268,473 | 5/1981 | Bower et al. | 264/234 |
| 4,292,105 | 9/1981 | Taylor | 427/331 |
| 4,626,306 | 12/1986 | Chabrier et al. | 156/180 |
| 4,680,224 | 7/1987 | O'Connor | 428/294 |
| 4,721,639 | 1/1988 | Shimp et al. | 428/252 |

FOREIGN PATENT DOCUMENTS

| | | | |
|---|---|---|---|
| 588381 | 12/1959 | Canada | 156/181 |
| 0013244 | 7/1980 | European Pat. Off. . | |
| 0125472 | 11/1984 | European Pat. Off. . | |
| 1267996 | 6/1961 | France . | |
| 2223173 | 10/1974 | France . | |
| 90775 | 7/1975 | Japan . | |
| WO83/01755 | 5/1983 | PCT Int'l Appl. . | |
| WO86/03449 | 6/1986 | PCT Int'l Appl. . | |
| 178811 | 8/1923 | United Kingdom . | |
| 1264432 | 2/1972 | United Kingdom . | |
| 1400852 | 7/1975 | United Kingdom . | |
| 1424168 | 2/1976 | United Kingdom . | |
| 1495845 | 12/1977 | United Kingdom . | |

OTHER PUBLICATIONS

"Carbopol® Water Soluble Resins," B. F. Goodrich, Cleveland, Ohio, May, 1986.
Japanese Patents Gazette, Part I—Chemical, Week X06, 17 Mar. 1976, Derwent Publications Ltd., (London GB)

*Primary Examiner*—James C. Cannon
*Attorney, Agent, or Firm*—Burns, Doane, Swecker & Mathis

[57] ABSTRACT

An improved multifilamentary fibrous material is formed having solid particles of a matrix-forming thermosetting resin substantially uniformly dispersed among adjoining filaments in the absence of fusion bonding. The thermosetting resin particles initially are dispersed in an aqueous medium containing an effective amount of a dissolved polymeric binding agent and the viscosity of the medium subsequently is substantially increased to at least 50,000 cps. to form a gelled impregnation bath having a plastic flow characteristic with shear-thinning behavior wherein the thermosetting resin particles are substantially uniformly suspended. The resulting impregnation bath is caused to flow between the adjoining filaments of the multifilamentary fibrous material with a concomitant viscosity reduction which aids in the incorporation of the resin particles. The concentration of the aqueous medium in the product is controlled to yield a uniform, handleable, drapable, tacky, and highly stable product. Upon the application of heat and pressure the improved product can be transformed into a fiber-reinforced composite article wherein the thermosetting resin forms the matrix phase.

23 Claims, 12 Drawing Sheets

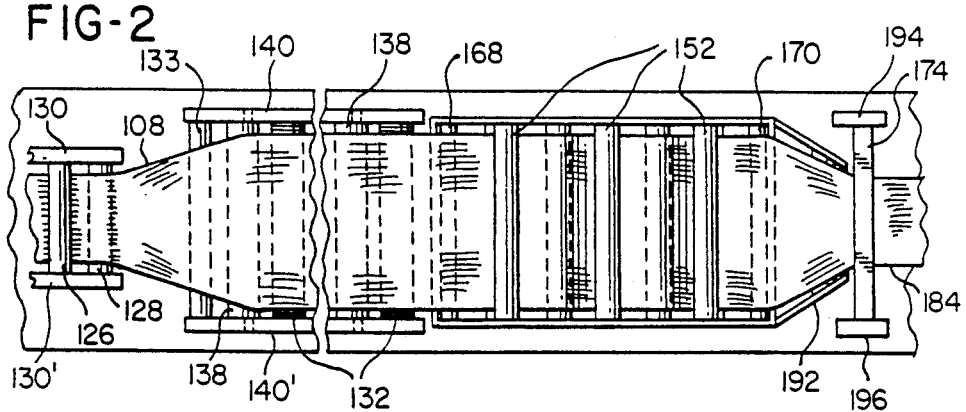
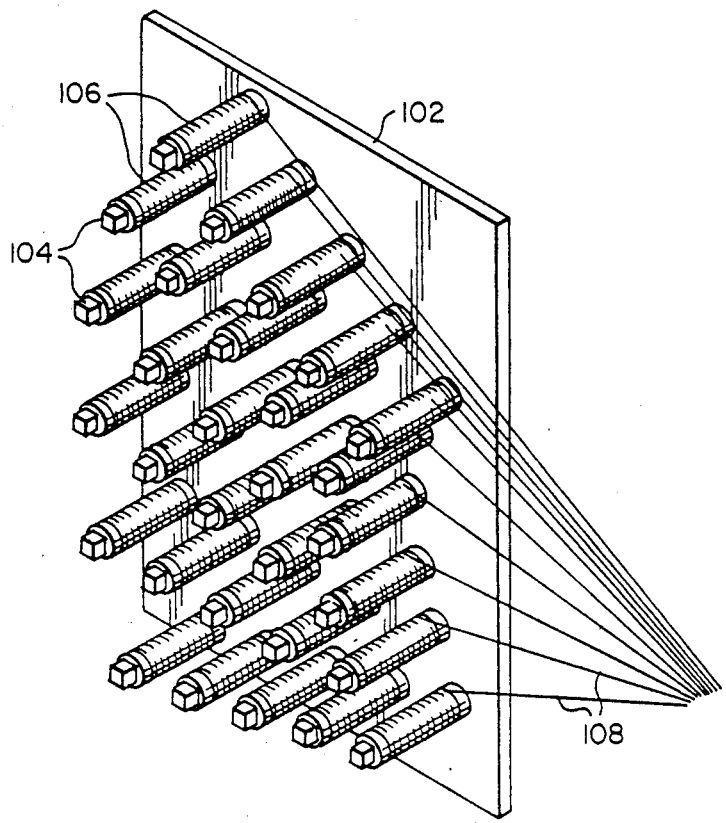

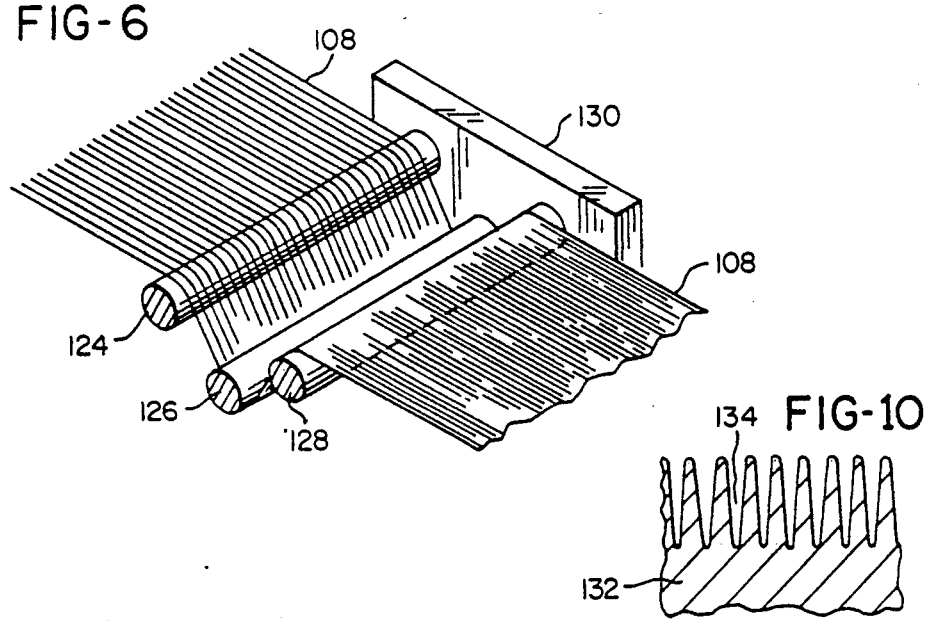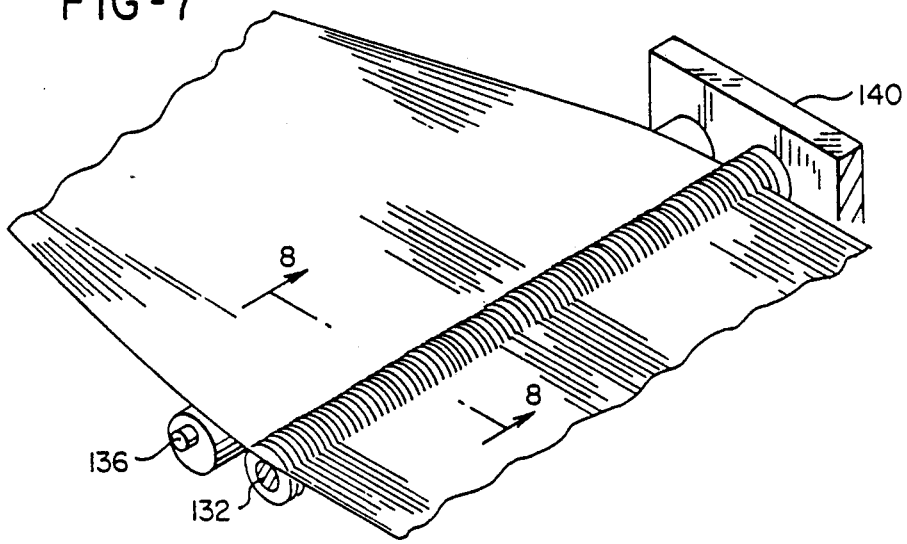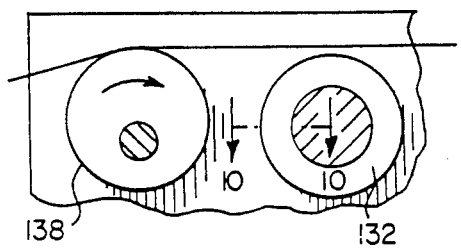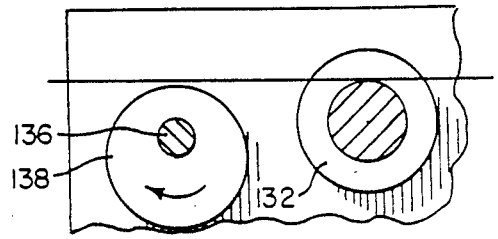

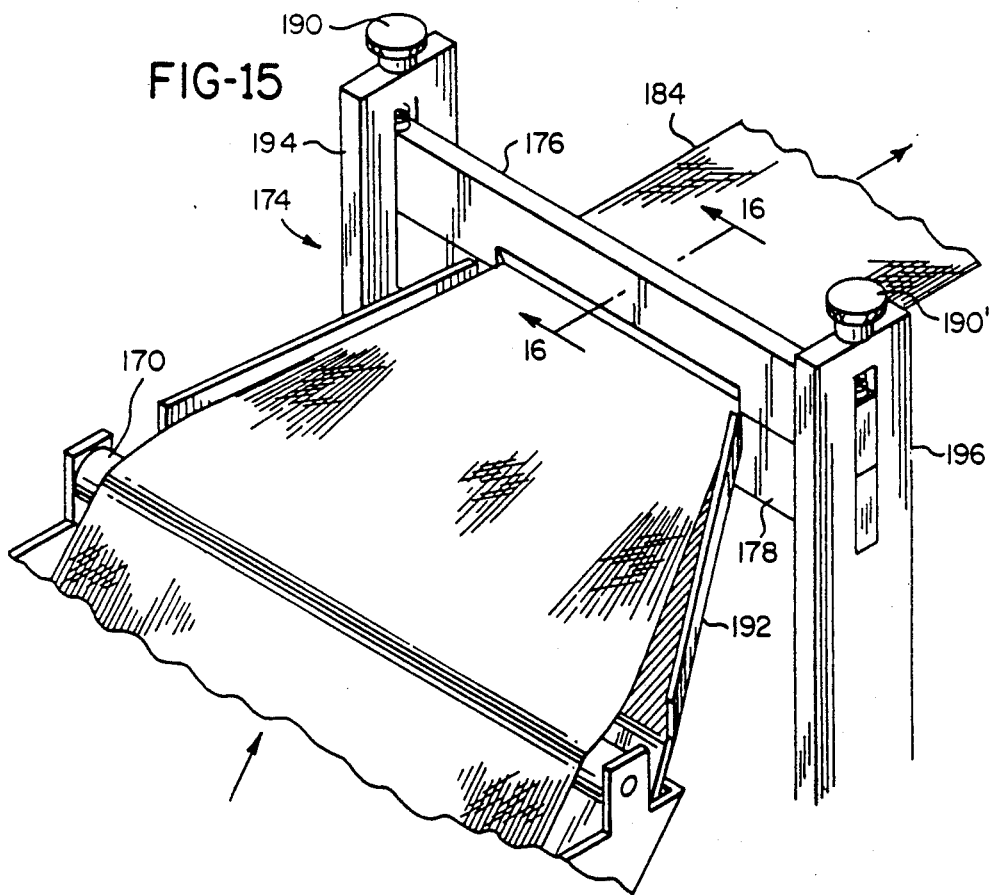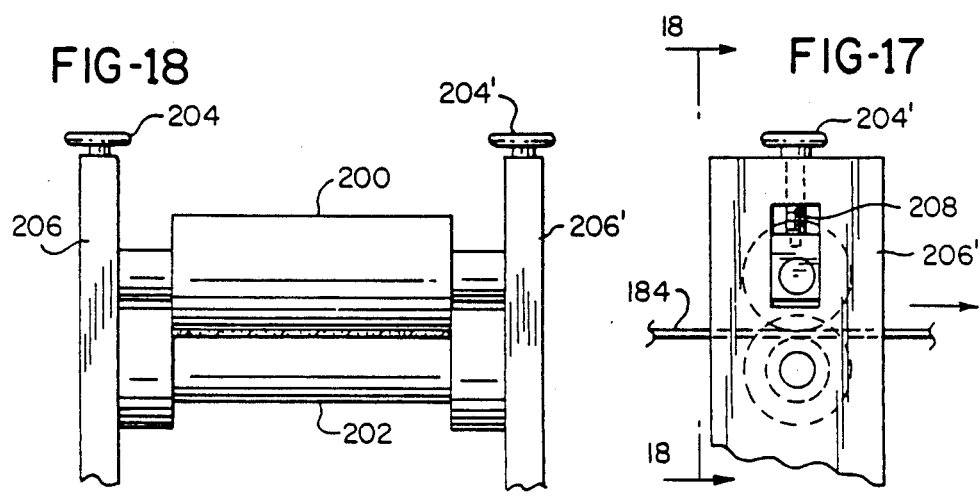

IMPROVED PREIMPREGNATED MATERIAL COMPRISING A PARTICULATE THERMOSETTING RESIN SUITABLE FOR USE IN THE FORMATION OF A SUBSTANTIALLY VOID-FREE FIBER-REINFORCED COMPOSITE ARTICLE

CROSS REFERENCE TO RELATED APPLICATION

This application is a divisional, of application Ser. No. 157,836, filed Mar. 3, 1988, now U.S. Pat. No. 4,919,739, which in turn is a continuation-in-part of U.S. Pat. No. 928,917, filed Nov. 7, 1986, now abandoned.

BACKGROUND OF THE INVENTION

Numerous techniques have been proposed in the past for the formation of composite articles wherein fiber reinforcement is provided within a matrix of a polymeric material. Heretofore such composite articles commonly have been prepared wherein the matrix is a highly cross-linked thermosetting resin. During the formation of such composite articles the fibrous material commonly is impregnated with a liquid comprising the neat or dissolved uncured or partially-cured thermosetting resin to form a pliable, tacky prepreg which is subsequently placed in the desired configuration and is cured to a predetermined solid form over an extended period of time. The drapable and tacky nature of such prepregs has greatly aided in their use when forming composite articles having a complex configuration since adjoining plies tend to adhere well to each other and stay in place during the composite formation process. Such resulting thermosetting prepregs commonly must be used promptly following their manufacture or stored under refrigeration so as to eliminate problems resulting from the premature curing of the same.

When attempts have been made to dissolve thermosetting resins in a solvent and to impregnate a fibrous material followed by evaporation of the solvent, difficulties commonly have been encountered. For instance, some thermosetting resins are not readily soluble thereby making uniform impregnation difficult to achieve. Complete solvent removal commonly has been a problem and contributes to void formation in the resulting composite article. Also, the solvent may be injurious to workers in the area unless special and often costly procedures are used to provide the requisite worker protection.

Blends of reinforcing fibers and thermoplastic fibers have been proposed for use in the formation of composite articles wherein the thermoplastic fibers are melted to form the matrix phase. Such blends inherently lack tack which is useful during layup to form a fiber-reinforced composite article.

Reference also can be found in the literature to providing the matrix-forming thermosetting resin or thermoplastic polymer as small solid particles which are mixed with the fibrous material prior to composite formation. Heretofore, such proposals have not become a commercial reality primarily because of the inability to achieve uniform impregnation of the fibrous reinforcement, the tendency of the particles to further segregate within the fibrous material and to separate from the fibrous material, and the necessity to melt the particles following placement among the fibers so as to immobilize the same. Such fusion has resulted in the formation of a stiff boardy product which lacks tack and is largely unsuitable for use in the formation of a composite article having a complex configuration. Also, when the particle impregnation is not uniform, the matrix will not be uniformly dispersed among fibers in the resulting composite article. This will result in a voidy product having resin-rich and resin-lean areas and unpredictable non-uniform mechanical properties.

British Patent No. 1,264,432 concerns the application of a dispersion of particles of a thermoplastic polymer to newly spun glass fibers.

British Patent No. 1,424,168 concerns the formation of a stiff sheet or tape prepreg wherein fibers are contacted with a bath containing water, thickening agent, and thermosetting resin or thermoplastic polymer particles which immediately thereafter are melted at a temperature between 60° to 100° C. to cause the particles to adhere to the fibers. Uniform fiber impregnation would not be achieved and the stable tacky and pliable product of the present invention would not result.

U.S. Pat. No. 4,292,105 concerns the impregnation of a fibrous material from a bath of the specified composition containing water, thickener, and thermosetting resin or thermoplastic polymer particles. The conditions described would not achieve uniform impregnation to produce a quality prepreg. Also, in the working examples the product would have no drapability since it was heated to fuse the polymer.

U.S. Pat. No. 4,626,306 concerns the impregnation of a fibrous lap with particles of a thermosetting resin or thermoplastic polymer by dipping in a bath containing the particles in the absence of a binding agent. Uniform fiber impregnation would not be achieved and the stable tacky and pliable product of the present invention would not result.

U.S. Pat. No. 4,680,224 makes reference to the impregnation of fiber strands with a poly(arylene sulfide) powder or a slurry of such powder. The patent is devoid of teachings concerning how such impregnation can be accomplished in the improved manner contemplated herein or how one could provide the improved product of the present invention.

Copending U.S. Ser. No. 114,362, filed Nov. 4, 1987, (now U.S. Pat. No. 4,894,105) of Robert Dyksterhouse and Joel A. Dyksterhouse is entitled "Production of Improved Preimpregnated Material Comprising A Particulate Thermoplastic Polymer Suitable For Use In The Formation Of A Substantially Void-Free Fiber-Reinforced Composite Article", and sets forth a technique for forming a tacky and drapable fibrous material which uniformly incorporates particles of thermoplastic polymer.

Copending U.S. Ser. No. 147,153, filed Feb. 5, 1988, of Alan C. Handermann and Edward D. Western is entitled "Improvements in the Formation of Preimpregnated Material Comprising Particulate Thermoplastic Polymer Suitable for Use in the Production of a Substantially Void-Free Fiber-Reinforced Composite Article Having Improved Transverse Properties", and sets forth a technique for improving the transverse properties of the resulting composite article which comprises a matrix of a thermoplastic polymer.

It is an object of the present invention to provide a method for the formation of an improved preimpregnated fibrous material suitable for the formation of a substantially void-free thermoset composite article comprising a plurality of adjoining substantially parallel reinforcing fibers.

It is an object of the present invention to provide an improved method for impregnating a fibrous material with solid particles of a matrix-forming thermosetting resin in a uniform and consistently reliable manner.

It is an object of the present invention to provide an improved method for producing a preimpregnated fibrous product suitable for use in the production of composite articles having solid particles of matrix-forming thermosetting resin substantially uniformly dispersed between adjoining filaments in a uniform and stable manner in the absence of fusion bonding.

It is an object of the present invention to provide a method for producing an improved preimpregnated product containing solid particles of thermosetting resin substantially uniformly dispersed among adjoining filaments which is drapable and tacky at ambient conditions, is handleable without segregation of the particles within the fibrous material, and which upon the application of heat and pressure can be transformed into a substantially void-free thermoset composite article of a predetermined configuration.

It is an object of the present invention to provide an improved method for producing a preimpregnated fibrous material suitable for use in the production of a composite article wherein reinforcing fibers are provided in a matrix of a thermoset resin with no solvent being present when the resin it is introduced among the reinforcing fibers.

It is an object of the present invention to provide an improved preimpregnated fibrous material suitable for use in the formation of a composite article comprising a fiber-reinforced thermoset resin which in preferred embodiments is capable of being substantially fully cured on a more expeditious basis.

It is an object of the present invention to provide an improved impregnated fibrous material suitable for use in the formation of a composite article comprising a fiber-reinforced thermoset resin which in preferred embodiments is capable of being substantially fully cured in the substantial absence of the generation of a volatile by-product.

It is an object of the present invention to provide an improved preimpregnated fibrous material which exhibits an extended shelf life at ambient conditions in the absence of refrigeration and is suitable for use in the formation of a fiber-reinforced thermoset resin.

It is a another object of the present invention to provide an improved preimpregnated fibrous material suitable for use in the formation of a fiber-reinforced substantially void-free composite article and which exhibits a combination of highly desirable characteristics as discussed herein including drapability, handleability without adverse consequences, and tack.

It is a further object of the present invention to provide an improved preimpregnated fibrous material suitable for use in the formation of high performance fiber-reinforced parts for use in aircraft, spacecraft, industrial machinery and automotive applications.

These and other objects, as well as the scope, nature and utilization of the present invention, will be apparent to those skilled in the art from the following detailed description and appended claims.

SUMMARY OF THE INVENTION

It has been found that a method for the production of an improved fibrous material suitable for the formation of a substantially void-free composite article comprising a plurality of adjoining substantially parallel reinforcing filaments (e.g., a single end, a plurality of ends, a cloth, etc.) in association with a matrix-forming thermosetting resin comprises:

(a) preparing a dispersion of solid particles of a thermosetting resin in an aqueous medium which contains an effective amount of a dissolved polymeric binding agent (preferably a polyacrylic acid binding agent possessing a cross-linked molecular structure), (b) substantially increasing the viscosity of the dispersion to form an improved impregnation bath whereby the viscosity of the resulting bath becomes at least 50,000 cps. and the impregnation bath has a plastic flow characteristic with shear-thinning behavior which is sufficient to substantially uniformly suspend the particulate thermosetting resin within the bath, (c) impregnating the adjoining substantially parallel reinforcing filaments with the bath under conditions wherein the bath is caused to flow between the adjoining filaments by the application of work wherein the bath flow inherently results in a reduction of the viscosity of the bath which aids in the incorporation of the particulate thermosetting resin between adjoining filaments, and (d) controlling the content of the aqueous medium in the resulting fibrous material to provide a product having the particles of matrix-forming thermosetting resin substantially uniformly dispersed between adjoining filaments which inherently (1) is drapable and tacky at ambient conditions, (2) is handleable without segregation of the particles within the fibrous material, and (3) which upon the application of heat and pressure can be transformed into a substantially void-free fiber-reinforced composite article of a predetermined configuration wherein the thermosetting resin becomes substantially completely cured and forms the matrix phase.

It has been found that a method for the production of an improved fibrous material suitable for the formation of a substantially void-free composite article comprising a plurality of adjoining substantially parallel reinforcing filaments in association with a matrix-forming thermosetting resin comprises:

(a) providing a plurality of reinforcing fibrous tows each comprising a plurality of adjoining substantially parallel filaments, (b) preparing a dispersion of solid particles of thermosetting resin in an aqueous medium which contains an effective amount of dissolved polyacrylic acid binding agent possessing a cross-linked molecular structure, (c) raising the pH of the aqueous medium (preferably through the addition of ammonia or an alkyl amine having a boiling point less than 100° C.) to form an improved impregnation bath wherein the viscosity of the resulting bath is substantially increased to at least 50,000 cps. through the stiffening of the molecules of the binding agent and the impregnation bath has a plastic flow characteristic with shear-thinning behavior which is sufficient to substantially uniformly suspend the particulate thermosetting resin within the bath, (d) situating the resulting bath within an impregnation apparatus, (e) aligning the reinforcing fibrous tows in a side-by-side relationship to form a substantially uniform sheet-like tape, (f) feeding the sheet-like tape to the impregnation apparatus, (g) impregnating the substantially uniform sheet-like tape with the bath while present in the impregnation apparatus under conditions wherein the bath is caused to flow between the adjoining filaments of the sheet-like tape by the application of work wherein the flow inherently results in a reduction of the viscosity of the bath which aids in the incorporation of the particulate thermosetting resin between adjoining filaments, and (h) controlling the content of the aqueous medium in the resulting sheet-like tape to provide a product having the particles of the matrix-forming thermosetting resin substantially uniformly dispersed between adjoining filaments in the absence of fusion bonding which inherently (1) is drapable and tacky at ambient conditions, (2) is handleable without segregation of the particles, and (3) which upon the application of heat and pressure can be transformed into a substantially void-free fiber-reinforced composite article of a predetermined configuration wherein the thermosetting resin becomes substantially completely cured and forms the matrix phase.

An improved preimpregnated fibrous material suitable for the formation of a fiber-reinforced composite article is provided which comprises (a) a plurality of adjoining substantially parallel reinforcing filaments, (b) an effective amount of a polymeric water-soluble binding agent (preferably a polyacrylic acid binding agent possessing a cross-linked molecular structure wherein the molecules are extended), (c) aqueous medium, (d) and solid particles of thermosetting resin substantially uniformly dispersed between adjoining filaments in the absence of fusion bonding, which inherently (1) is drapable and tacky at ambient conditions, (2) is handleable without segregation of the particles within the fibrous material, and (3) which upon the application of heat and pressure can be transformed into a substantially void-free composite article of a predetermined configuration wherein the thermosetting resin becomes substantially completely cured and forms the matrix phase.

BRIEF DESCRIPTION OF DRAWINGS

FIG. 2 is a top view of a portion of the apparatus of FIG. 1, taken along lines 2—2;

FIG. 3 is a perspective view of the board for mounting spools of fibrous tows to be impregnated in the apparatus of FIG. 1;

FIG. 6 is a sectional view of another portion of the aligning means of the apparatus shown in FIG. 1;

FIG. 7 is a partial sectional view of the grooved rollers and eccentric rollers utilized in a portion of the apparatus in FIG. 1;

FIG. 8 is a cross-sectional view of the apparatus shown in FIG. 7;

FIG. 9 is a cross-sectional view of the apparatus shown in FIG. 8 with the eccentric roller rotated 180°;

FIG. 10 is a sectional view of the apparatus of FIG. 9 taken along lines 10—10;

FIG. 15 is a perspective view of the die section shown in FIG. 1;

FIG. 17 is a side sectional view of a portion of the rollers shown on the left side bottom portion of FIG. 1;

FIG. 18 is a rear view of the rollers of FIG. 17 shown along line 18—18 thereof;

DESCRIPTION OF PREFERRED EMBODIMENTS

Figure 1:
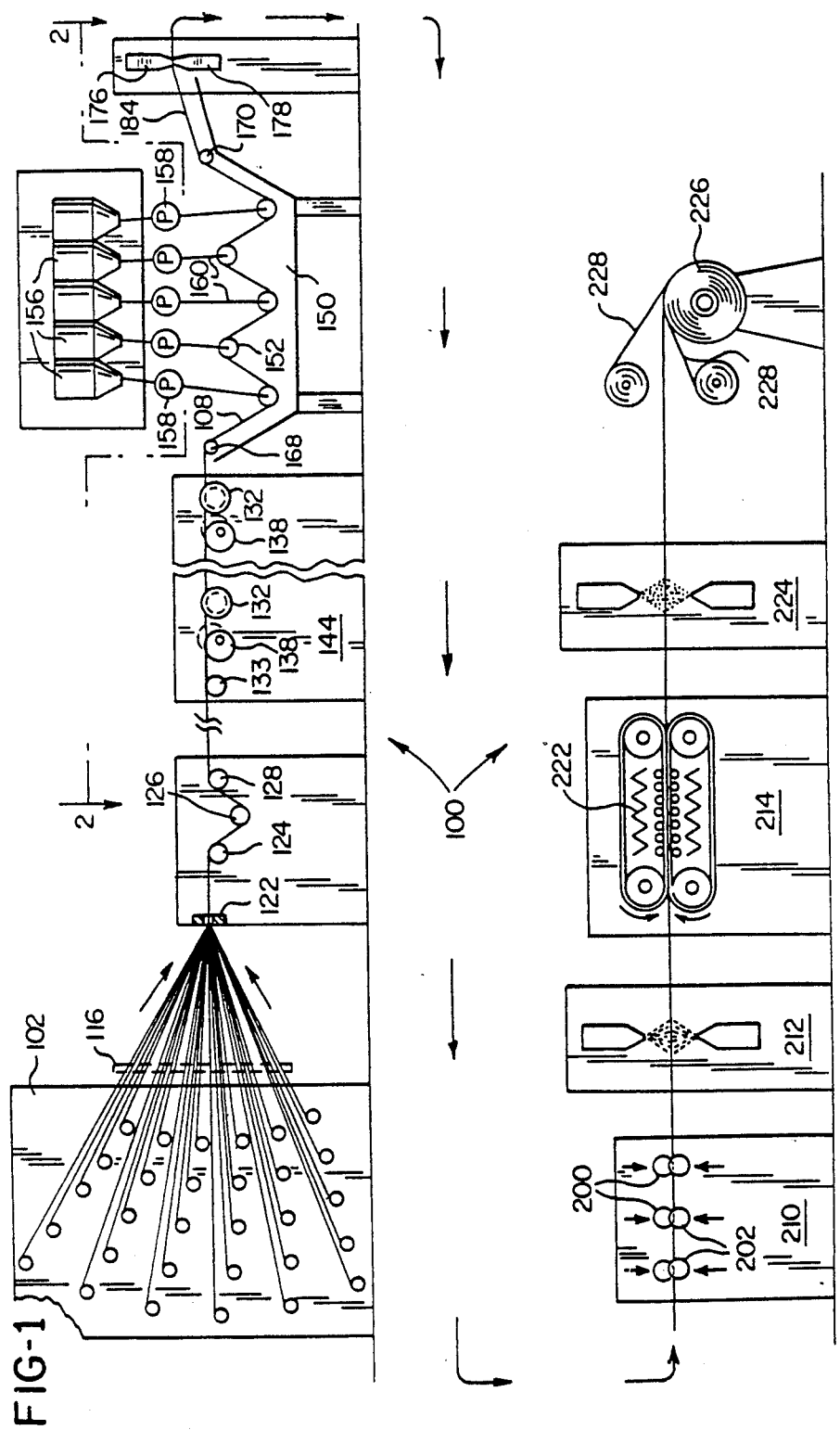
FIG. 1 is a schematic overall view of a preferred apparatus for impregnating a plurality of adjoining tows in accordance with the improved process of the present invention.

A fibrous material comprising a plurality of adjoining substantially parallel filaments initially is selected for use as fibrous reinforcement in the present invention. Such fibrous material may be provided as a single multifilamentary end, a plurality of multifilamentary ends each comprising a plurality of substantially parallel filaments, a cloth (e.g., woven, knitted, or braided) which incorporates a plurality of substantially parallel filaments, etc. For instance, fibrous tows or tapes of varying widths conveniently may be selected as the reinforcing fibrous material. A single tow of a relatively narrow width may be impregnated. Alternatively, wider fibrous materials having widths of 1 to 48 inches or more likewise may undergo such impregnation.

Those fibrous materials which heretofore have been used as fibrous reinforcement in the production of composite articles commonly are selected. For instance, representative fibrous materials include carbon, glass, aramid, silicon carbide, silicon nitride, boron nitride, other synthetic polymers capable of use at elevated temperatures, mixtures of these, etc. The preferred carbonaceous fibrous materials contain at least 90 percent carbon by weight which may comprise carbon which is either amorphous or graphitic in nature. Preferred carbonaceous fibrous materials commonly contain at least 3,000 (e.g., 3,000 to 12,000, or more) substantially parallel filaments per end. Such carbon filaments commonly are approximately 4 to 10 microns in diameter. Representative preferred carbonaceous fibrous materials for use in connection with the present invention are Celion carbon fibers which are commercially available from BASF Structural Materials, Inc., Charlotte, N.C., U.S.A. Also, glass filaments which are capable of being readily impregnated by the flow of the impregnation bath described hereafter may be selected. Such glass filaments commonly have a diameter of approximately 10 to 20 microns (e.g., 12 to 13 microns). Suitable aramid fibers are commercially available from E.I. DuPont, Wilmington, Del., U.S.A., under the Kevlar trademark and may have a diameter as low as 5 to 8 microns. The fibrous material preferably is unsized, or if a size is present such size does not preclude the ready insertion of the thermosetting resin particles between adjoining filaments during the impregnation step (described hereafter). It is, of course, important that the reinforcing fibers selected well retain their fibrous integrity and reinforcing properties at the temperature used to consolidate and cure the thermosetting resin particles while in association with such fibers during composite formation. For instance, in a preferred embodiment the fibrous reinforcement can withstand temperatures greater than 537.8° C. (i.e., 1000° F.).

During the preparation of the impregnation bath employed in the process of the present invention, small solid particles of a matrix-forming thermosetting resin initially are dispersed in an aqueous medium containing a dissolved polymeric binding agent and having a relatively low viscosity. Thereafter the viscosity of the dispersion is substantially increased to form a stable improved impregnation bath having a plastic flow characteristic with shear-thinning behavior (as described hereafter).

The thermosetting resin which is selected for use in the present invention must be capable of being placed in a powder form (i.e.. as small solid particles at ambient conditions while in a less than a fully cured state) and be capable of forming a substantially void-free matrix when heated under pressure to accomplish consolidation and curing. When heated at an appropriate temperature such particles of thermosetting resin will either completely or partially melt or otherwise be rendered pliable and/or heat-sinterable at their adjoining surfaces so as to form the predetermined configuration of the composite article. It is preferred that the solid particles of thermosetting resin be capable of undergoing complete melting when heated and that such melting take place at a temperature below that at which substantial additional crosslinking takes place. The substantially complete curing of the thermosetting resin when heated under pressure (preferably at a higher temperature) may take place via a condensation reaction, an addition reaction, or combination of condensation and addition reactions. Conventional curing agents, hardeners, or other agents designed to initiate or promote the desired crosslinking may also be present. If the curing takes place via a condensation reaction with the evolution of gaseous by-products, means are provided to accommodate the removal of such volatiles (i.e., an open mold or a vacuum bag procedure) during at least a portion of the composite formation step (as described hereafter). In a particularly preferred embodiment, a thermosetting resin is selected which cures during at least the final portion of the composite formation step via an addition reaction without the evolution of a gaseous product. The use of a thermosetting resin which undergoes such addition reaction during curing simplifies the achievement of the desired substantially void-free composite article when the preimpregnated fibrous material of the present invention is transformed.

It is preferred that the thermosetting resin exhibits a continuous use temperature of at least 25° C., and most preferably a continuous use temperature of at least 90° C. Such continuous use temperature is determined by measuring the fully moisture saturated glass transition temperature of the substantially completely cured thermosetting resin.

Representative solid particulate resins for use when practicing the present invention include thermosetting resins selected from among the phenolic resins, polyester resins, melamine-formaldehyde resins, urea-formaldehyde resins, casein-formaldehyde resins, polyimide resins, polyurethane resins, epoxy resins, diallyl phthalate resins, vinyl ester resins, polybutadiene(1,2) resins, cyanate ester resins, cyanamide resins, etc. The preferred thermosetting resins for use in the present invention are the polyimide resins, epoxy resins, and cyanate ester resins.

The phenolic resins commonly are formed by the reaction of phenol and formaldehyde and may be of either the resole or novolac types. Representative commercially available phenolic resins which may be provided in solid particulate form are the PLENCO 07200 molding compounds available from Plastic Engineering Co. of Sheboygan, Wis., U.S.A., and DUREZ 17080 molding compound available from Occidental Chemical of North Tonawanda, N.Y., U.S.A.

The polyester resins commonly are either alkyd resins or unsaturated polyester resins. The alkyd resins are formed by the reaction of saturated dibasic acids with polyhydroxy compounds. The unsaturated polyester resins are formed by the reaction of dibasic acids (e.g., fumaric acid) or anhydrides (e.g., maleic anhydride) which are partially or completely composed of 1,2-ethylenically unsaturated monomer units with dihydric alcohols. During such formation the resulting polymer commonly is dissolved in a reactive vinyl monomer, such as styrene, vinyl toluene, diallyl phthalate, or methyl methacrylate. The addition of a free radical initiator such as an organic peroxide results in a crosslinking reaction between the unsaturated polymer and the unsaturated monomer. Representative commercially available alkyd resins which may be provided in solid particulate form together with their source are the GLASKYD 2000-4000 series of molding compounds available from American Cyanamid of Perrysville, Ohio, U.S.A. A representative commercially available unsaturated polyester resin is PALATAL HT resin which has been partially cured to become a solid at ambient temperature. Such unsaturated polyester resin is commercially available from BASF Aktiengesellschaft of Ludwigshafen, West Germany.

The melamine-formaldehyde, urea-formaldehyde, and casein-formaldehyde resins frequently are termed amino resins. These commonly are formed by the condensation of melamine, urea or casein with formaldehyde resulting in a cross-linked resin. Representative melamine resins which may be provided in solid particulate form are the PERSTORP 791–796 resins which are available from Perstorp, Inc. of London, England.

The polyimide thermosetting resins are preferred for use in the present invention and include the poly(bismaleimide) resins. These may be provided as crosslinkable homopolymers, copolymers, or terpolymers, and are commonly produced by the reaction of an aromatic dianhydride with an aromatic diamine. Particularly preferred high use temperature polyimides are of the reverse Diels-Alder (RDA) polyimides. During the formation of the RDA polyimides, amide formation first takes place. This is followed by imidization and an irreversible Diels-Alder reaction, and a combination via an addition reaction to form a stable cross-linked polyimide. Accordingly, the preferred RDA polyimide resins are substantially fully imidized and are capable of undergoing an addition cross-linking reaction in the substantial absence of the generation of volatile by-products. Fully imidized PMR-15 polyimide is commercially available from Hysol Grafil Composite Components Co. of Cleveland, Ohio, U.S.A. and is an example of a particularly preferred RDA polyimide for use in the present invention. The fully imidized PMR-15 polyimide is prepared from three monomers: monomethylester of 5-nornborne-2,3-dicarboxylic acid, dimethyl ester of 3,3',4,4'-benzophenone tetracarboxylic acid, and 4,4'-methylene dianiline in the mole ratio 2:2.087:3.087. Another representative commercially available thermosetting polyimide is THERMID 1P-600 resin available from National Starch and Chemical Company of Bridgewater, N.J., U.S.A.

The poly(bismaleimide) resins undergo polymerization by reaction of the maleimide double bond with another unsaturated system or by the Michael addition of nucleophylic species at relatively low temperature without the evolution of volatile byproducts. Such poly(bismaleimide) resins may be modified in the sense that usual comonomers, such as vinyl or allyl compounds or diamino or aminophenal compounds, are added. A preferred poly(bismaleimide) resin is modified 5250-2 poly(bismaleimide) resin supplied by BASF Aktiengesellschaft of Ludwigshafen, West Germany. Other representative poly(bismaleimide) resins are KERIMID resin available from Rhone-Poulenc Inc. of Monmouth Junction, N.J., U.S.A. or Rhone-Poulenc S.A. of Paris, France, and the Compimide resins available from Technochemie GmbH of West Germany.

Heretofore, thermosetting polyimide resins commonly have been introduced to the fibrous reinforcement while dissolved in a solvent. Accordingly, the present invention offers significant processing advantages since there is no need to remove and handle a solvent which in at least some instances may pose a health hazard when practicing the concept of the present invention. Such solvent removal in the prior art commonly is time consuming, requires the use of special equipment, and requires the use of special procedures to protect workers in the area.

The polyurethane resins are formed by the reaction of diisocyanates with polyols, polyamides, alkyd polymers, and polyether polymers. Representative commercially available polyurethane resins which may be provided in solid particulate form are the US0050, 60, 70 and 80 series resins available from Dexter Co. of Arlington, Tex., U.S.A.

The epoxy resins contain epoxide groups and commonly are curable by reaction with an appropriate curing agent such as an amine, alcohol, phenol, carboxylic acid, acid anhydride, or mercaptan. Brominated epoxy resins, cycloaliphatic epoxy resins and epoxyimide resins are included in the epoxy classification. Representative commercially available epoxy resins which may be provided in solid particulate form are Rigidite 5208 resin available from NARMCO of Anaheim, Calif., U.S.A. which has been partially cured to become a solid at ambient temperature; Epon 1000 and 2000 resins available from Shell Chemical Co. of Houston, Tex., U.S.A.; and MH19F-0217 novolac epoxy resin available from Dexter Co. of Arlington, Tex., U.S.A.

The diallyl phthalate resins commonly are supplied as prepolymers such as diallyl phthalate or diallyl isophthalate and commonly are cured by peroxides. Other variations include trifunctional diallyl maleate, triallylcyanurate, and allyl carbonate. Representative commercially available diallyl phthalate resins which may be provided in solid particulate form are the DAP molding compounds available from Cosmic Plastics of San Fernando, Calif., U.S.A.

The vinyl ester resins commonly are esters of acrylic acid and/or methacrylic acid. They are often derived from an epoxy resin. Frequently, the curing is accomplished via the polymerization of unsaturation. Representative commercially available vinyl ester resins which may be provided in solid particulate form are PALATAL V7519 resin available from BASF Aktiengesellschaft of Ludwigshafen, West Germany, which has been partially cured to become a solid at ambient temperature.

Polybutadiene(1,2) resins commonly are crosslinked by means of the pendant vinyl group in the prepolymer stage. The hardness and crosslink density is a function of the severity at the post cure time and temperature.

The cyanate ester and cyanamide resins were introduced during the early 1970's and are formed when the monomers essentially trimerize via an addition reaction to form thermosetting modified triazine structures. Representative commercially available cyanate ester resins which may be provided in solid particulate form are those of the BT series available from Mitsubishi Gas Company of Japan.

The matrix-forming thermosetting resin preferably is provided as small solid particles having a particle size in the range of approximately 0.1 to 100 microns, and most preferably a particle size of 0.1 to 20 microns. In a particularly preferred embodiment at least 50 percent of the particles are smaller than 10 microns. Accordingly, the mean particle size preferably is less than 50 microns. Those thermosetting resins which melt with difficulty or are merely heat-sinterable are provided as extremely small particles. Cryogenic grinding or other known grinding or particle-forming techniques may be employed to provide the thermosetting resin in an extremely fine powder form.

The aqueous medium in which the solid particles of thermosetting resin are dispersed contains water as the major component and optionally may include in a minor concentration one or more water-miscible organic liquids which do not interfere with the desired uniform impregnation (e.g., methanol, ethanol, isopropanol, ethylene glycol, etc.). In some instances, the presence of such water-miscible organic liquids, because of their increased volatility, may expedite the removal of a portion of the aqueous medium following impregnation, should this be desired. However, in a preferred embodiment the aqueous medium is substantially pure water.

A suitable polymeric binding agent is dissolved in an effective concentration in the aqueous medium in which the solid particles of thermosetting resin are initially dispersed while at a relatively low viscosity. Such binding agent must be capable of facilitating a substantial increase in the viscosity of the dispersion during a subsequent step of the process to form an improved highly stable gelled impregnation bath having a plastic flow characteristic with shear-thinning behavior wherein the polymer particles are substantially uniformly suspended. Such increase in viscosity commonly is accomplished through the addition of an agent which interacts with the dissolved polymeric binding agent. The resulting impregnation bath containing the dissolved polymeric binding agent, when caused to flow between adjoining filaments of the fibrous material by the application of work, exhibits a shear-thinning behavior which inherently results in a reduction of the impregnation bath viscosity and thereby greatly aids in the incorporation of the solid particulate thermosetting resin between adjoining filaments. The binding agent when present in the resulting impregnation bath also causes the filaments to adhere well to each other and to exhibit tacky properties in the presence of the aqueous medium.

The preferred water-soluble polymeric binding agent which possesses the requisite properties for use in the present invention is a polyacrylic acid binding agent possessing a crosslinked molecular structure. Such binding agent is a water-soluble carboxy vinyl polymer (sometimes termed carboxy polymethylene) the following basic structure:

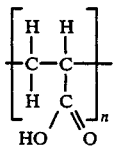

The crosslinks are slight in nature and commonly are provided by polyalkenyl polyether at a level which allows for water solubility. When heretofore used in cosmetic products, this material has been known as "carbomer". This polymeric binding agent is commercially available from B.F. Goodrich, Cleveland, Ohio, U.S.A. under the Carbopol trademark, and is described in its May, 1986 publication entitled "Carbopol® Water Soluble Resins". Representative, water-soluble binding agents of this type which are available from B.F. Goodrich are Carbopol 910, Carbopol 934, Carbopol 940, and Carbopol 941. The polyacrylic acid binding agent possessing a cross-linked molecular structure advantageously may possess a molecular weight from 450,000 to 4,000,000, and preferably from 750,000 to 3,000,000. Such binding agents commonly possess a coiled molecular structure when purchased.

The water-soluble binding agents employed in the present invention commonly are provided in the dispersion prior to the substantial increase in viscosity in a concentration of approximately 0.01 to 5 percent (e.g., 1 to 5 percent) based upon the total weight of the dispersion, and preferably in a concentration of approximately 0.01 to 2 percent by weight based upon the total weight of the dispersion. If the concentration of the binding agent is too low, the desired subsequent substantial increase in viscosity will not be possible or the level of tack obtained will not be sufficient. Also, if the concentration of binding agent is too great, no concomitant advantage will be realized and the binding agent may interfere with the desired composite properties. The higher molecular weight binding agents (as described) offer the advantage of functioning at lesser concentrations. Accordingly, in a particularly preferred embodiment the water-soluble binding agent is present in the initial dispersion in a concentration of approximately 0.1 to 1.5 percent by weight (e.g., in a concentration of approximately 0.1 to 0.8 percent by weight).

Other representative water-soluble polymeric binding agents suitable for use in the present invention include polyvinyl alcohol and polyvinyl pyrrolidone.

The particulate thermosetting resin commonly is provided in the initial dispersion containing the dissolved polymeric binding agent in a concentration of approximately 5 to 50 percent by weight based upon the total weight of the dispersion, and preferably in a concentration of approximately 10 to 30 percent by weight (e.g., approximately 15 percent by weight).

The initial dispersion may optionally contain a surfactant in a minor concentration to aid in the wetting of the particles of the thermosetting resin. For instance, the surfactant may be present in a concentration of approximately 0.005 to 0.5 percent by weight of the total dispersion, and preferably in a concentration of 0.01 to 0.2 percent by weight. Any surfactant may be employed provided it does not interfere with the subsequent viscosity increase or otherwise adversely influence the resulting product, such as through the creation of an excessive amount of foam or bubbles. Representative surfactants which may be used to advantage in the present process include surfactants based on alkylaryl polyether alcohols (e.g., alkyl phenoxypolyethoxy ethanol), sulfonates and sulfates. A surfactant commercially available from the Rohm and Haas Company, Philadelphia, Pa., U.S.A., under the Triton X100 trademark, may be used to advantage.

A small amount of a lubricant such as glycerine may optionally be provided in the initial dispersion. For instance, glycerine may be provided in a concentration of approximately 2 percent by weight. However, good results are achieved in the total absence of such lubricant.

A finely divided particulate filler may also be included in the impregnation bath in order to modify the properties of the resulting composite article. Representative fillers include carbon powder; metallic powders, such as aluminum, titanium, etc.; silicates; silicon; tungsten carbide; porcelain; clay; feldspar; quartz; titanates; mica; glass beads; silica; etc.; and discontinuous fibers such as inorganic or organic fibers. In a preferred embodiment such fillers are not employed.

The viscosity of initial dispersion is sufficiently low so that the resin particles can be thoroughly dispersed throughout the aqueous medium while using moderate agitation. Particularly good results are obtained when both the polymeric binding agent and the particulate thermosetting resin are blended together as solid particles and are thereafter introduced into the aqueous medium with moderate agitation. Commonly, the viscosity of the initial dispersion is well below 50,000 cps when tested using a Rheometrics Stress Rheometer (Model RSR/M) while operating at a shear rate of 0.01 reciprocal second. Preferably, the viscosity of the initial dispersion is no more than 30,000 cps., and most preferably no more than 20,000 cps. (e.g., 2,000 to 20,000 cps.) in accordance with such test conditions. However, satisfactory results are achieved at greater viscosities when the initial dispersion exhibits a sufficiently high shear-thinning behavior to enable good dispersion of the particles of thermosetting resin while being well agitated. See, for instance, the process embodiments reported in the examples.

Once the dispersion of the particulate thermosetting resin is achieved under such relatively low viscosity conditions, the viscosity is substantially increased from the viscosity level initially exhibited to form an improved impregnation bath having a plastic flow characteristic with shear-thinning behavior which is sufficient to substantially uniformly suspend the particulate thermosetting resin within the bath. More specifically, the viscosity of the dispersion is raised to at least 50,000 cps. when tested using a Rheometrics Stress Rheometer at a shear rate of 0.01 reciprocal second. Such viscosity increase preferably is at least 50 percent, and viscosity increases of 1.5 to 25 times, or more, may be utilized. Commonly, the resulting viscosity will be within the range of approximately 50,000 to 3,000,000 cps. when using a Rheometrics Stress Rheometer at a shear rate of 0.01 reciprocal second, and preferably within the range of 50,000 to 1,000,000 cps. (e.g., 50,000 to 250,000 cps.). Such viscosity increase also is accompanied by a significant increase in the tackiness and binding properties of the binding agent.

The viscosity commonly is caused to increase through the addition of an agent which interacts with the dissolved polymer binding agent. Such interaction in preferred embodiments may be accomplished through the adjustment of the pH of the initial dispersion. For instance, when a dissolved polyacrylic acid binding agent possessing a cross-linked molecular structure is employed, the dispersion inherently exhibits an acidic pH which commonly falls within the range of approximately 2.5 to 3.5. When a base is added to the initial dispersion, the corresponding adjustment in the pH causes the stiffening (i.e., uncoiling and extension) of the previously coiled molecules of such binding agent which substantially raises the viscosity of the dispersion with the particles of thermosetting resin being substantially uniformly suspended in a highly stable manner within the resulting impregnation bath. For instance, sufficient base may be added to the dispersion to accomplish some neutralization and to raise the pH to within the range of 4 to 10, and most preferably within the range of 6 to 8. The neutralization step also results in a dramatic increase in the binding and tackifying properties.

The base used to stiffen the previously coiled molecules of the binding agent may be sodium hydroxide. However, it has been found that improved results are achieved when the viscosity of the previously formed dispersion of thermosetting resin particles is substantially increased through the addition of a base selected from the group consisting of ammonia, an alkyl amine, and mixtures of the foregoing. Representative alkyl amines suitable for use in the process of the present invention have a boiling point less than 100° C. and include methylamine, ethylamine, trimethylamine, and mixtures of these. The utilization of an ammonia or alkyl amine base in the context of the present invention has been found to make possible the formation of a composite article which exhibits superior mechanical properties. The ammonia or alkyl amine preferably is dissolved in an aqueous solvent when added to the previously formed dispersion of solid particles of a thermosetting resin in an aqueous medium which contains an effective amount of the dissolved polyacrylic acid binding agent (as described). In a particularly preferred embodiment the ammonia and/or alky amine is provided in a relatively dilute concentration in water of approximately 5 to 20 percent by weight when added to the dispersion of thermosetting resin particles. Also, in a particularly preferred embodiment ammonia is dissolved in water to provide an ammonium hydroxide solution. The viscosity of the dispersion is caused to increase as the ammonia and/or alkyl amine interacts with the dissolved polyacrylic acid binding agent (as described) to form an ammonium or alkyl ammonium polyacrylate binding agent having stiffened molecules possessing a crosslinked molecular structure.

Alternatively, when the dissolved polymeric binding agent is polyvinyl alcohol, borax (i.e., $Na_2B_4O_7 \cdot 10H_2O$) may be added to bring out the desired viscosity increase. When polyvinyl pyrrolidone is employed as the polymeric binding agent, the initial dispersion may be simply acidified whereby the pH is lowered in order to bring about the required substantial increase in viscosity.

The plastic flow behavior of the resulting impregnation bath provides the particulate thermosetting resin in a vehicle which is capable of bringing about the impregnation of the fibrous material in a highly uniform manner over an extended period of time. The particulate thermosetting resin is well suspended therein, thereby making possible the formation of a consistent and uniform product.

In a preferred embodiment, the resulting impregnation bath possesses a plastic flow rheology characterized by a Brookfield Yield Value above the minimum value required to permanently suspend even the largest particles of the thermosetting resin present in the static bath while under the influence of gravity. Such Minimum Brookfield Yield Value can be theoretically calculated for any specific particle of thermosetting resin in accordance with the following equation:

$$\text{Minimum Brookfield Yield Value} = [23.6 R(D-D_o)g]^{\frac{2}{3}}$$

with units in dynes/cm.$^2$, where:
R = Particle Radius (cm.),
D = Particle Density (gm./cc.),
$D_o$ = Suspending Medium Density (gm./cc.), and
g = Gravitational Constant = 980 cm./sec.$^2$.
For example, the Minimum Brookfield Yield Value for a 50 micron particle of thermosetting resin (D = 1.30 gm./cc.) is approximately 6.6 dynes/cm.$^2$. The Brookfield Yield Value for any dispersion can be determined with sufficient accuracy using a Brookfield RVT viscometer and spindle No. 1 in accordance with the following equation:

$$\text{Brookfield Yield Value} = \frac{\text{Apparent Viscosity at 0.5 RPM} - \text{Apparent Viscosity at 1.0 RPM}}{100}.$$

In preferred embodiments the Brookfield Yield Value of the impregnation bath is at least 1.5 times the Minimum Brookfield Yield Value, and most preferably at least 2 times the Minimum Brookfield Yield Value (e.g., 2 to 10 times, or more) in order to build further stability into the improved impregnation bath which is utilized in the process of the present invention.

Next, the adjoining substantially parallel reinforcing filaments are impregnated with the improved impregnation bath under conditions wherein the bath is caused to flow between adjoining filaments by the application of work wherein the bath flow inherently results in a substantial reduction of the relatively high viscosity of the bath which aids in the incorporation of the particulate thermosetting resin between adjoining filaments. Accordingly, the improved impregnation bath exhibits a shear-thinning behavior which is an important element of the present invention. For instance, a dispersion viscosity of 100,000 cps. using a Rheometrics Stress Rheometer (Model RSR/M) at a shear rate of 0.01 reciprocal second for such an improved impregnation bath typically will be reduced to less than 500 cps. at a shear rate of 500 reciprocal seconds. This behavior permits the particulate thermosetting resin from settling while in the static bath at zero shear rate conditions and allows the particles of thermosetting resin to be impregnated between adjoining filaments when work is applied to the bath. Also, once the zero shear condition is reestablished within the resulting fibrous material, a highly stable prepreg product results as discussed herein.

The improved impregnation bath may be caused to flow between the adjoining filaments of the fibrous material by any one of a number of techniques. Preferably, the adjoining filaments are somewhat spread at the time of impregnation. The impregnation may be carried out while the fibrous material is immersed in the impregnation bath. Work is applied to the bath as the adjoining filaments while under tension are passed in contact with at least one solid member (e.g., a stationary rod or roller). Alternatively, the impregnation may be carried out as the filaments contact the outer surface of at least one perforated tube through which the bath is forced, or the filaments while in contact with the impregnation bath are passed through a die and/or between one or more sets of rollers. If desired, the impregnation of the fibrous material may be carried out immediately following fiber formation with the fibers passing to the impregnation apparatus.

Next, the content of the aqueous medium in the resulting fibrous material is controlled to provide a product having the particles of matrix-forming thermosetting resin substantially uniformly dispersed between adjoining filaments in the absence of fusion bonding. Following impregnation, the concentration of aqueous medium in the resulting fibrous material is controlled at the desired level. Commonly, such aqueous medium within the fibrous material is controlled at a concentration above approximately 40 percent by weight, and preferably within the range of approximately 10 to 70 percent by weight based upon the total weight. In a particularly preferred embodiment, the aqueous medium is provided at a concentration within the range of approximately 40 to 60 percent by weight.

Commonly, the fibrous material following impregnation is dried under conditions wherein a portion of the aqueous medium is volatilized and then is immediately used for composite formation, or is otherwise stored under conditions wherein it is sealed and further loss of the aqueous medium is minimized or prevented prior to composite formation.

In another embodiment of the process, the resulting fibrous material following drying to remove aqueous medium is subsequently contacted (e.g., sprayed) with additional aqueous medium in order to maintain the desired characteristics. Accordingly, the quantity of aqueous medium within the product can be reduced or increased at will to fine tune the characteristics of the resulting product to best meet the needs of a specific end use.

Commonly, the resulting product which is suitable for the formation of a substantially void-free composite article contains the particles of matrix-forming thermosetting resin in a concentration of approximately 6 to 45 percent by weight, and preferably in a concentration of approximately 8 to 30 percent by weight (e.g., approximately 15 percent by weight). Commonly, the resulting product contains the fibrous material in a concentration of approximately 15 to 55 percent by weight (e.g., approximately 20 to 30 percent by weight), and the water-soluble binding agent in a concentration of approximately 0.02 to 2.2 percent by weight (e.g., approximately 0.04 to 1.5 percent by weight).

The resulting product prior to composite formation is drapable at ambient conditions and can readily be shaped in a manner similar to that of a prepreg formed using an uncured or partially-cured thermosetting resin which is not in solid particulate form. Such drapable character preferably is evidenced by a flexural rigidity of less than 15,000 mg.·cm., and most preferably less than 10,000 mg.·cm. (e.g., less than 5,000 mg.·cm.) when tested in accordance with ASTM D1388. This enables the formation of a composite article by filament winding or a composite article wherein the impregnated fibrous material must assume a complex configuration within a mold. The tacky nature of the product can be attributed to the gelled nature of the impregnation bath. This enables adjoining layers of the fibrous material to well adhere and to remain at a predetermined location during composite formation. In a preferred embodiment, the resulting fibrous material passes the tack test of NASA Technical Bulletin 1142. Also, the product prior to composite formation is highly stable and handleable without segregation of the particles within the fibrous material. Such absence of segregation leads to the retention of the solid particles of thermosetting resin, prevents their migration within the fibrous material, and leads to the formation of a highly uniform composite article with no significant variation throughout its cross section.

Substantially void-free composite articles can be formed from the product of the present invention upon the application of heat which exceeds the melting temperature of the thermosetting resin particles or reaches the temperature at which the thermosetting resin particles become heat-sinterable followed by curing. In preferred embodiments such temperature is below that at which any significant crosslinking of the resin occurs during the initial melting and/or heat sintering, and the temperature subsequently is raised to a higher temperature at which substantial crosslinking takes place. The thermosetting resin becomes substantially completely cured to form the matrix phase of the resulting composite article. The major portion of the aqueous medium may be removed when the fibrous material is either inside or outside the mold. During composite formation pressure also is applied and a means commonly is provided for the removal of volatilized aqueous medium and any other gaseous byproducts present therein such as those resulting from the curing reaction. Typical mold pressures during composite formation are approximately 0.3 to 4 MPa (e.g., 0.6 to 2.5 MPa). The substantially void-free nature of the product is manifest by less than a two percent void content in the composite article which is produced (preferably less than one percent void content).

In a preferred embodiment the product of the present invention is capable of forming a composite article having a zero degree flexural strength of at least 60 percent of the theoretical value when tested in accordance with ASTM D790-84a, Method II, Procedure A, at a span-to-depth ratio of 32:1, and most preferably at least 70 percent of the theoretical value.

Also, in a preferred embodiment the product of the present invention is capable of forming a composite article having a zero degree flexural modulus of at least 80 percent of the theoretical value when tested in accordance with ASTM D790-84a, Method II, Procedure A, at a span-to-depth ratio of 32:1, and most preferably at least 85 percent of the theoretical value.

The theoretical flexural modulus value of a fiber-reinforced composite can be defined as follows:

$$E_F(\text{theoretical}) = K_F[V_f E_f + (1 - V_f)E_m],$$

$$\text{where } K_F = 2/(1 + \sqrt{E_T/E_c}),$$

$E_F(\text{theoretical})$ = theoretical flexural modulus of the composite, $E_T$ = tensile modulus of the composite, $E_c$ = compressive modulus of the composite, $E_f$ = tensile modulus of the fiber, $E_m$ = flexural modulus of the matrix, and $V_f$ = volume fraction of the fiber.

In order to determine the percent translation of the theoretically attainable flexural modulus the following equation is used:

$$\text{Percent Flexural Modulus Translation} = \frac{E_f(\text{ASTM } D790)}{E_F(\text{theoretical})} \times 100.$$

The theoretical flexural strength value and the percent translation of the theoretically attainable flexural strength equations have been simplified to the following for ease of calculation:

$S_F(\text{theoretical}) = V_f S_f$, where $S_F(\text{theoretical})$ = theoretical flexural strength of the composite, $S_f$ = tensile strength of fiber, and $V_f$ = volume fraction of the fiber.

In order to determine the percent translation of the theoretically attainable flexural strength the following equation is used:

$$\text{Percent Flexural Strength Translation} = \frac{S_f(\text{ASTM } D790)}{S_F(\text{theoretical})} \times 100.$$

The improved composite article mechanical properties made possible when using a dissolved polyacrylic acid binding agent possessing a cross-linked molecular structure and ammonia or an alkyl amine to adjust the pH are particularly apparent when one examines the 90° tensile strength values in accordance with ASTM D3039. In a preferred embodiment, the product of the present invention is capable of forming a composite article having a 90° tensile strength in accordance with ASTM D3039 of at least 60 percent of the theoretical value, and most preferably at least 80 percent of the theoretical value.

The theoretical 90° tensile strength value of a fiber-reinforced composite can be defined as follows:

$S_{TT}(\text{theoretical}) = S_{TM}$, where $S_{TT}(\text{theoretical})$ = theoretical 90° tensile strength of the composite, and $S_{TM}$ = tensile strength of the thermosetting resin used in the matrix.

In order to determine the percent translation of the theoretically attainable tensile strength the following equation is used:

$$\text{Percent 90° Tensile Strength Translation} = \frac{S_{TT}(\text{ASTM } D3039)}{S_{TT}(\text{theoretical})} \times 100.$$

The theory whereby the use of ammonia and/or an alkyl amine to form a gelled impregnation bath leads to the formation of a composite article which exhibits significantly improved mechanical properties (particularly in the transverse direction) is considered to be complex and incapable of simple explanation. It is believed, however, that the improvement in transverse properties can be traced to the creation of enhanced adhesion between the fibers and the matrix formed by the thermosetting resin which is lacking if a metallic base, such as sodium hydroxide, is utilized.

Figure 4:
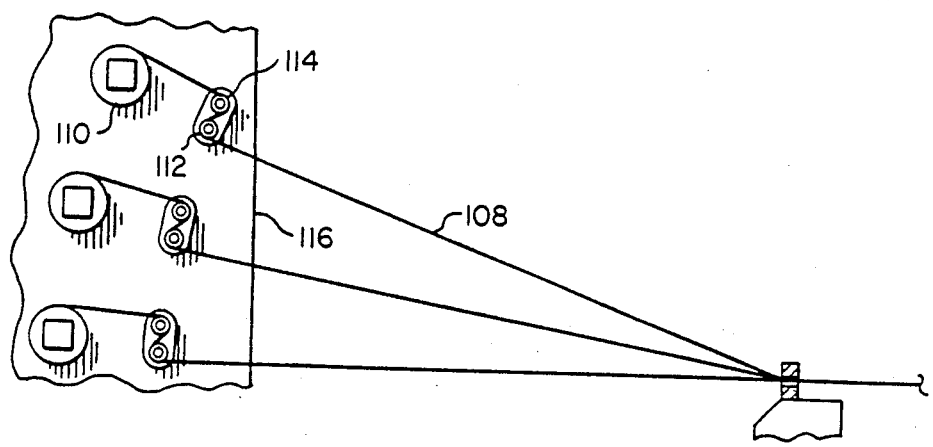
FIG. 4 is a partial sectional view of a tensioning apparatus utilized in the initial portion of the apparatus shown in FIG. 1.
Figure 5:
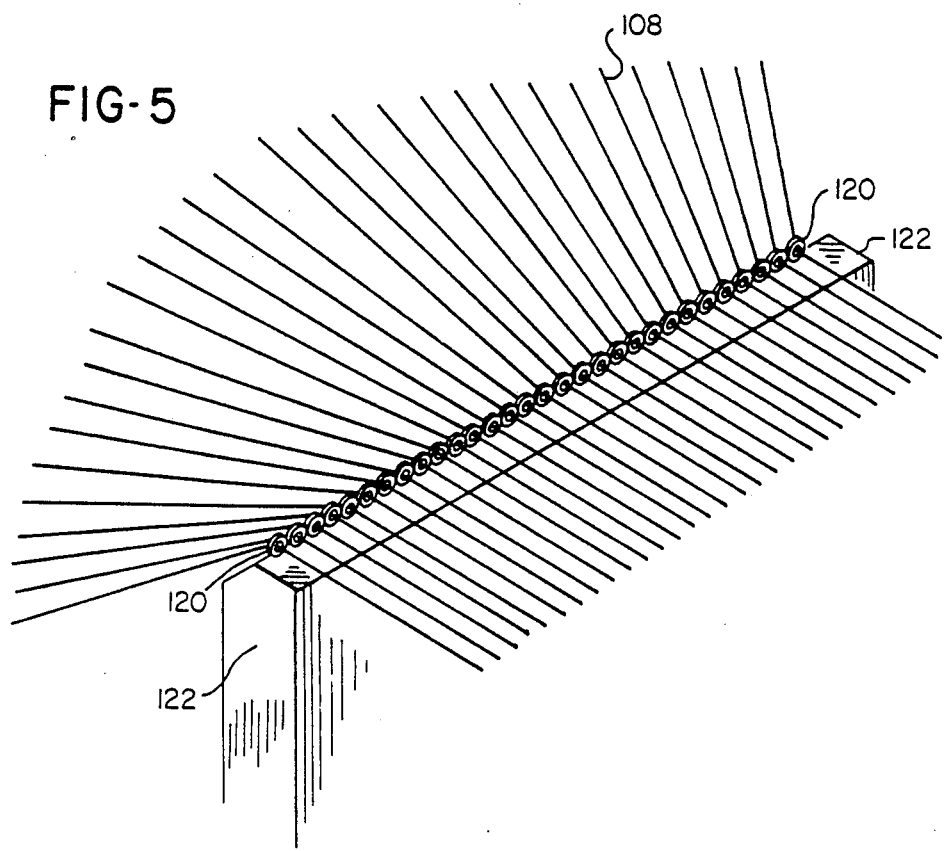
FIG. 5 is a sectional view of a portion of the apparatus used to align the fibrous tows as they pass through the apparatus of FIG. 1.

Reference now is made to the drawings for a discussion of preferred impregnation apparatus arrangements for use when carrying out the process of the present invention. With reference to FIGS. 1 and 3, a support 102 has affixed thereto supporting members 104 for a plurality of spools of fibrous tow 106 spaced across a surface thereof. The fibrous tows 108 while shown as a singular line in reality are comprised of a plurality of substantially parallel filaments. The tows are maintained under tension as best shown in FIG. 4 by means of spaced rollers 110, 112 and 114 in a spaced relationship to each other on a support 116. The tows 108 are then passed through a series of eyelets 120 shown in FIG. 5 which are spaced apart from each other on support member 122. The plurality of tows is then passed around a series of rods best shown in FIG. 6 and identified by reference numerals 124, 126, and 128, each of which is supported on member 130. As the tows 108 proceed through the aligning apparatus they begin to take on a sheet, fabric, or tape-like unidirectional configuration. The rods 124, 126, and 128 are supported between members 130 and 130', as shown in FIG. 2. There could be a greater number of rods comprising the aligning rods 124, 126, and 128 as desired. To further assist in the aligning of the fibrous tows and to form a more uniform sheet-like tape, the plurality of tows are fed to a grooved roller 132 having grooves 134 best shown in FIGS. 7 and 10. A roller 138 is eccentrically mounted on shaft 136 and rotates in clockwise direction as best shown in FIGS. 7, 8, and 9 so that the tows may be alternatingly lifted and uniformly spread about the grooved roller 132. This is best shown comparing the rotation of the eccentrically mounted roller in FIG. 8 to that shown in FIG. 9. The eccentrically mounted roller 138 has a smooth surface which facilitates movement of the tows over the roller. The grooved roller and the eccentrically mounted roller are supported on members 140 and 140'. A plurality of these eccentric and grooved rollers are shown in aligning section 144. Positioning roller 133 passes the tows to the eccentrically mounted roller 138.

Figure 12:
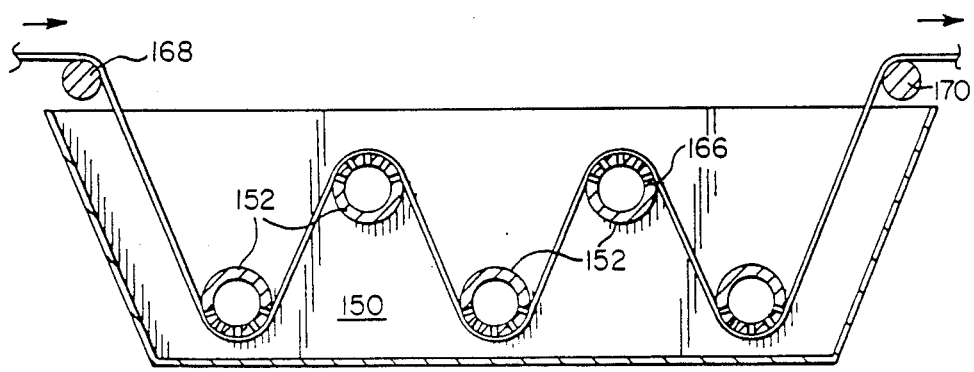
FIG. 12 is a side sectional view of the apparatus shown in FIG. 11 taken along lines 12—12.

After the aligning step, the tows are impregnated in the impregnation section 150 of FIG. 12 where the tows 108 are in a parallel side-by-side arrangement with each tow 108 abutting another tow. The sheet-like tape is then passed over a plurality of perforated stainless steel tubes 152 The impregnation bath maintained in a plurality of reservoirs 156 is pumped under a pressure maintained by pressure valves 158 through inlet tubes 160 and through the perforations 162 of the tubes 152. The perforated tubes 152 are maintained in position in section 150 by nuts 164 and 164'. The liquid impregnation bath is forced to flow between the adjoining filaments of the sheet-like tape both from above and below as it passes over and under the perforated tubes 152 thereby insuring that the fibrous bundles are thoroughly impregnated to the desired level with the impregnation bath. To insure that the maximum amount of impregnation bath is applied to the moving fibrous tows, the apertures 162 are distributed only over a radius portion 166 of the tube 152 which is in contact with the sheet-like tape. The fibrous tow passes into the impregnation section by passing over inlet positioning rod 168 and exits the impregnation section by passing over outlet positioning rod 170.

After the sheet-like tape is impregnated at station 150, it is sized to the desired form by passing through the die section 174 comprised of upper and lower die members 176 and 178 respectively. These die members have pointed sections 180 and 182, respectively, to pinch or nip the impregnated sheet-like tape 184 thereby causing excess impregnation bath 186 to remain in the impregnation section 150. By the action of the die, the impregnation bath more thoroughly impregnates the sheet-like tape. The impregnation bath acts as a lubricant as the impregnated sheet-like tape passes through die members 176 and 178. The die members maintain a pressure on the sheet-like tape by a tensioning arrangement 190 and 190'. The tensioning arrangement, of FIG. 15, permits control of at least die member 176 to adjust the spacing of pointed members 180 and 182. The impregnated tape passes into the die members 176 and 178 while passing over trough 192. The impregnation bath 186, in excess of that required for impregnation of the tape, is pinched out by the die members onto the trough 192 for return to the impregnation section 150. The die members are supported in upright members 194, 196. The overall flow of the sheet-like tape 108 to form the impregnated tape 184 is best shown in FIG. 2. The dies allow production of materials to a desired aerial weight and dimension (thickness and width).

After the impregnated sheet-like tape leaves the die members, it then proceeds to a series of rollers which squeeze the impregnated tape in order to fully spread the impregnation bath in, through and about the fibrous material that makes up the tape as is shown in the bottom left portion of FIG. 1, and more specifically in FIG. 18. The impregnated tape passes through a series of opposed rollers 200 and 202 maintained under tension by a tensioning device 204 and 204'. The tensioning device is arranged in upright members 206 and 206' and utilizes a threaded bolt member 208 to keep the upper roller 200 tightly against the impregnated tape 184 as the tape moves through the opposed rollers. The rollers are located in roller section 210.

After the impregnated sheet-like tape passes through roller section 210, a fine coating spray of the impregnation bath optionally is applied in the spray chamber 212. The spray chamber may or may not be used depending upon the processing characteristics desired in the impregnated sheet-like tape. In a preferred embodiment no coating is applied.

Figure 19:
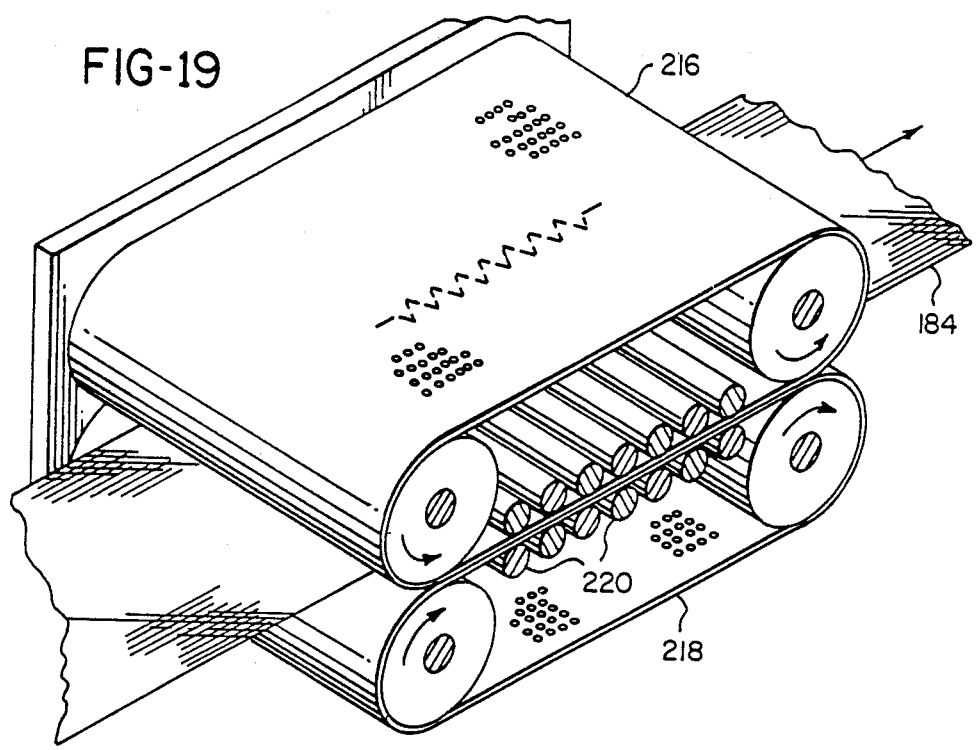
FIG. 19 is a perspective view of the drying apparatus shown in FIG. 1.

Thereafter, the impregnated tape may be dried to remove a portion of the aqueous medium of the impregnation bath in heating chamber 214 by passing the impregnated sheet-like tape between heating elements. In FIG. 19 is shown upper and lower belts 216 and 218, respectively which are continuous belts moving in the same direction and which may be perforated polymeric belts, such as Teflon polytetrafluoroethylene belts. Preferably the heating chamber maintains the temperature at an appropriate level to evaporate in a controlled manner a portion of the aqueous or volatile materials present in the impregnated sheet-like tape. It is to be appreciated that the appropriate concentration of aqueous medium in the sheet-like tape may be controlled with precision in the heating chamber. The moving belts are held in position above and below the impregnated tape 184 by use of a plurality of bars, supports or rollers 220. Electric resistance heating elements (or steam heating elements) 222 control the drying temperature in the drying unit 214. It is to be appreciated that the moisture content of the impregnated tape can vary depending on the drying time and temperature.

If desired, an effective amount of an adhesive may be sprayed in spray chamber 224 as the dried impregnated tape passes. However, in a preferred embodiment no adhesive is applied.

Figure 20:
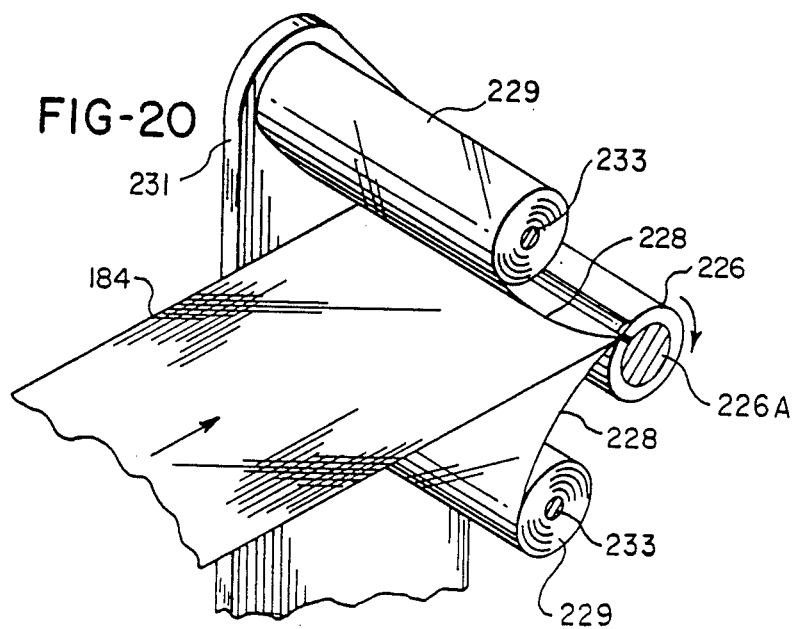
FIG. 20 is a perspective view of the take-up apparatus shown in FIG. 1.

Subsequent to the spray chamber 224, the impregnated sheet-like tape 184 is formed into a roll 226 supported on shaft 226A. During the roll forming process, the tape is covered along top and bottom sides by protective sheet material 228. As shown in FIG. 20, a support member 231 has mounted thereon a pair of shafts 233, each of which carries a roll of the protective sheet material 229. As the tape 184 is fed to the shaft 226A, the protective sheet material in the form of webs 228 covers the top and bottom sides of the tape. The triple-ply arrangement forms the roll 226.

Figure 11:
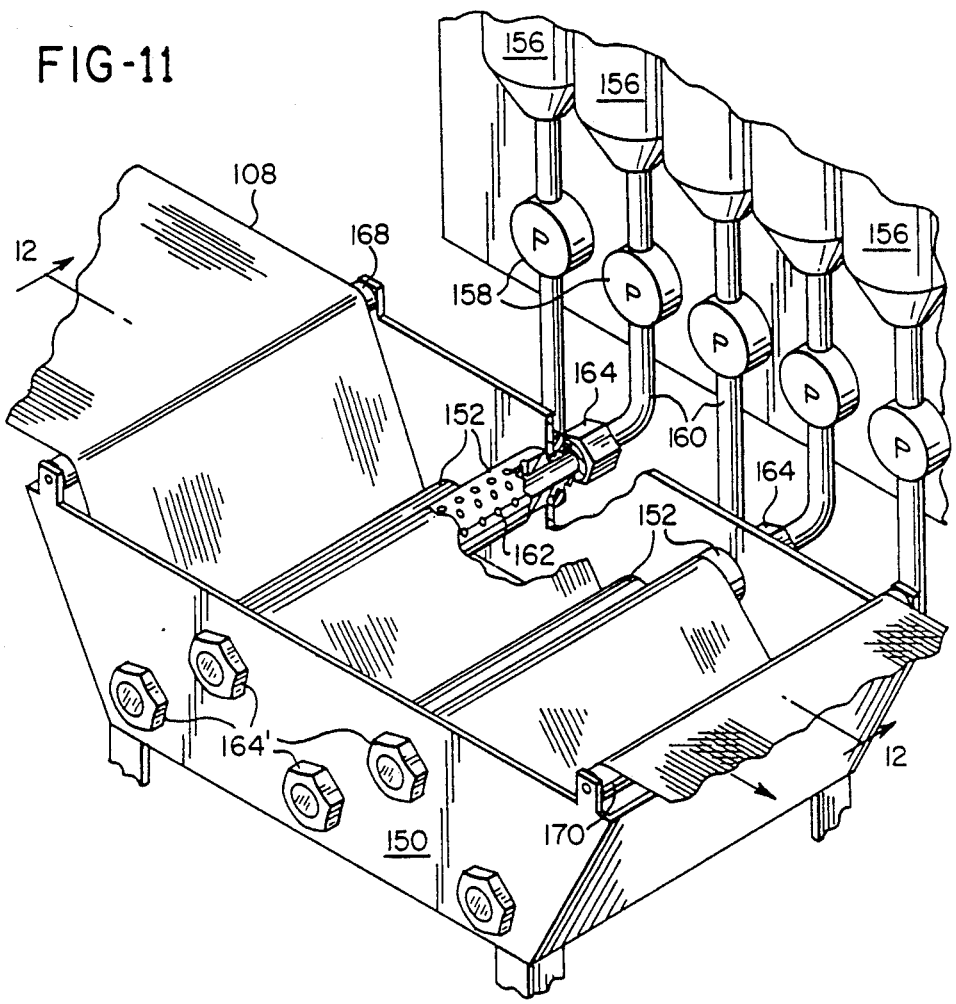
FIG. 11 is a perspective view of the impregnation section shown in FIG. 1.
Figure 21:
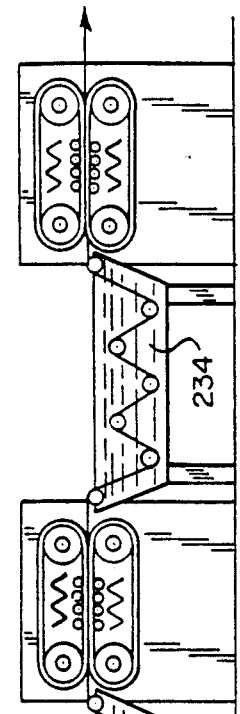
FIG. 21 is a schematic side sectional view of a preferred apparatus for impregnating cloth.

The impregnation of a preformed woven or knitted fabric comprising ends of a plurality of adjoining substantially parallel filaments is illustrated in FIG. 21. Supply roll 230 feeds fabric 232 to immersion tank 234 containing the impregnation bath as described herein. The fabric 232 passes over and under a plurality of perforated rollers 236 which are comparable to rollers 152 as best shown in FIGS. 11 and 12. After the fabric is impregnated, it passes through heating zones 242 having opposed belts 240 with supporting bars 238 and heating elements 244 comparable to that shown in FIGS. 19.

While FIG. 21 shows separate immersion tanks, it is to be appreciated that any number may be utilized as desired to appropriately impregnate the fabric. Different concentrations of particles of thermosetting resin may be present in the tanks to obtain the desired impregnation results. The concentration may be up to 15 percent (e.g., 10 to 15 percent) by weight of the particles of thermosetting resin in step 1, up to about 25 percent (e.g., 20 to 25 percent) by weight of the particles of thermosetting resin in step 2, and up to 35 percent (e.g., 30 to 35 percent) by weight of particles of thermosetting resin in step 3. The impregnated fabric leaving the final drier could then be taken up on a roller as desired.

Figure 22:
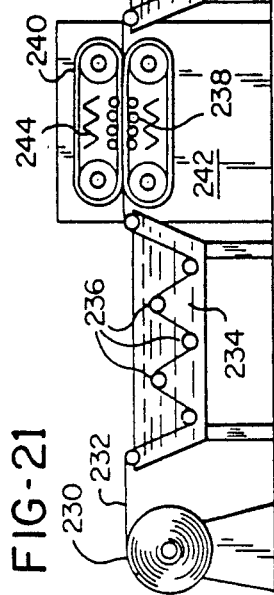
FIG. 22 is a schematic exploded view of the formation of a laminate resulting from the impregnated fibrous material of the present invention.
Figure 23:
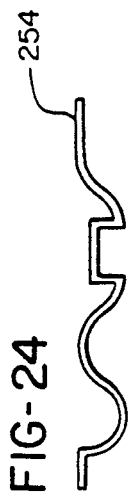
FIG. 23 illustrates the closing of the die about the laminated material when forming a composite article of a predetermined configuration.
Figure 24:
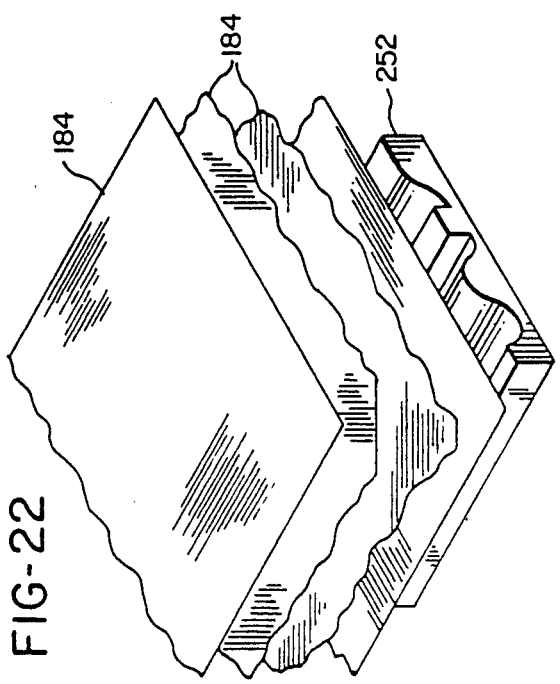
FIG. 24 is a side view of the resulting composite article.

Regardless of the technique used for preparing the impregnated fibrous material, a laminate may be prepared from the same and shaped into a desirable configuration. Because the present invention obtains a tacky and drapable product that may be shaped to a predetermined configuration in a relatively easy manner, composite articles having a complex configuration readily can be formed. For instance, a plurality of impregnated sheet-like tapes 184 such as those obtained from the apparatus as best shown in FIG. 1, can be cut to the desired size. The sheets are then placed into an opposed pair of mold members 250 and 252 as best shown in FIGS. 22 and 23. By the application of appropriate heat and pressure the final configured part 254 is obtained. The application of known mold release coatings such as silicon-based materials are generally applied prior to the insertion into mold members 250 and 252.

The final shaped part 254 is a composite laminate having useful mechanical properties. It is characterized as being lightweight, and may be used in the formation of various aerospace and automotive components.

Figure 13:
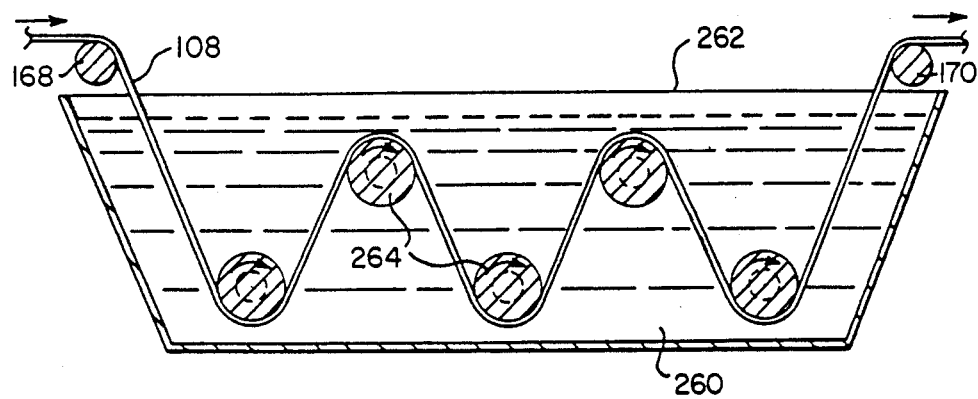
FIG. 13 is an alternative arrangement for impregnating the fibrous tow which could be substituted for that shown in FIG. 11.
Figure 14:
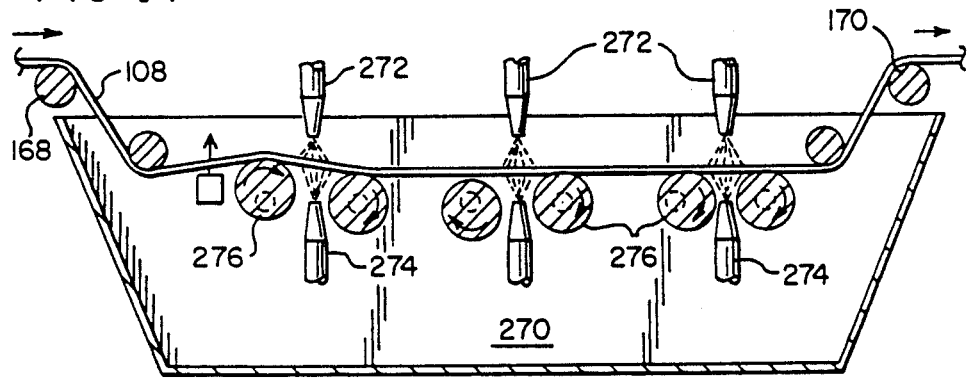
FIG. 14 is an alternative arrangement for the impregnation section which could be substituted for that shown in FIG. 11.
Figure 16:
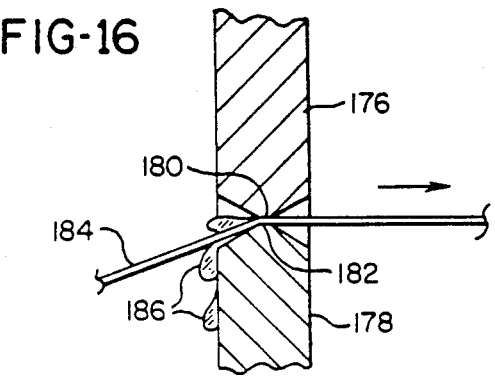
FIG. 16 is a cross-sectional view taken along line 16—16 of FIG. 15.

An alternative or a conjunctive piece of apparatus to impregnation section 150 is immersion chamber 260 with a reservoir of the impregnation bath 262 retained therein. FIG. 13 shows a series of moving rollers 264 which the fibrous sheet-like tape passes over and under. While it may be somewhat duplicative, under appropriate circumstances, one may need additional impregnation into the sheet-like tape. Accordingly, a perforated tube 152 could be used in place of one or all of the rollers 264 as shown in immersion chamber 260. An alternative embodiment to the use of the perforated roller 152 would be to spray the fibrous tow in spray chamber 270 as shown in FIG. 14. Spray members 272 and 274 could be utilized to spray the impregnation bath above and below the fibrous sheet-like tape as it moves through the chamber. Again rollers 276 could be configured to be perforated such as perforated roller 152 shown in FIG. 11.

Figure 25:
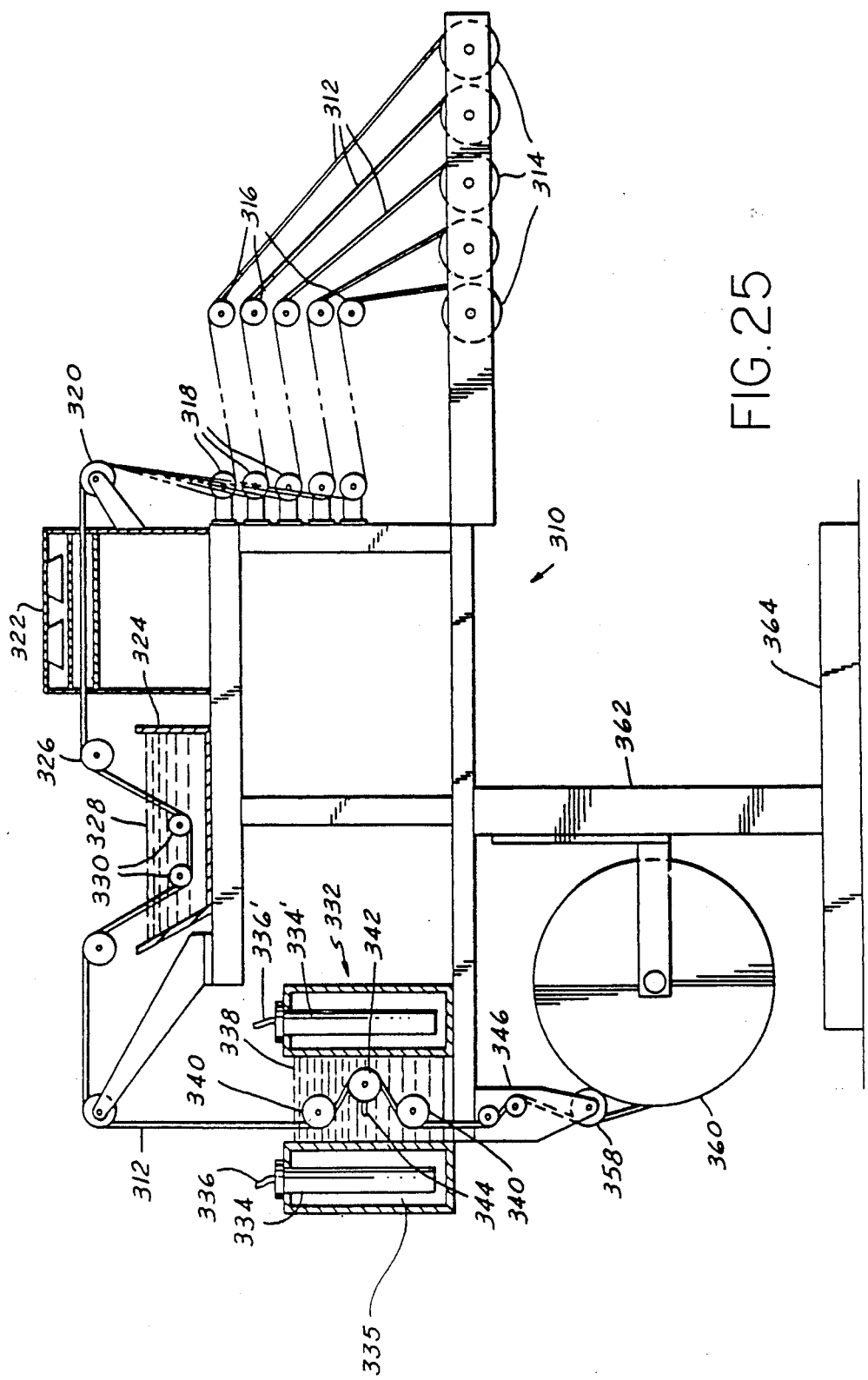
FIG. 25 is a schematic drawing of another preferred apparatus for impregnating tows in accordance with the improved process of the present invention.

A further apparatus to impregnate to fibrous material is illustrated in FIGS. 25 to 29. FIG. 25 is a schematic diagram of an overall apparatus to be utilized in the present invention. A plurality of tows 312 are fed to the impregnating apparatus 310 from spools 314. A particularly preferred tow would contain 12,000 substantially parallel carbon filaments per tow of Celion carbon fibers available from BASF Structural Materials, Inc., Charlotte, N.C., U.S.A. Approximately 60 spools can be provided at position 314. The tow is maintained under tension between rollers 316, 318 and introductory roller 320. A heating chamber 322 volatilizes any sizing that may be present on the tow. A temperature range in the heating chamber 322 may be from 400° C. to 925° C., preferably about 600° C. In addition to or as an alternative to heating chamber 322, the tow can be passed over roller 326 and through solvent reservoir 324. The solvent therein could be used to remove any sizing agent that may be present. Suitable solvents would be the aromatic, chlorinated aliphatic and heterocyclic materials such as methylethyl ketone, methylene chloride, acetone, xylene, methylpyrrolidone. Rollers 330 underneath the level of solvent 328 may be adjusted to provide an appropriate residence time in the solvent tank.

After the fibrous material leaves the solvent tank, it is then impregnated with the impregnation bath. A number of different techniques can be utilized to accomplish the desired impregnation through the application of work. The only requirement is that the impregnation bath well flow between adjoining filaments. The objective is to have as minimal voids as possible, i.e., minimal portions of the tow that are not in contact with particulate thermosetting resin.

FIG. 25 shows the tow 312 being immersed from top to bottom in an immersion tank of chamber 332 which includes heating elements 334 and 334' for bath temperature control positioned in heat element chambers 335 and having respective wire leads 336 and 336'. The fibrous material 312 as it proceeds through the impregnation bath 338 is wound about multiple rollers 340 and 342. Roller 342 slides in slot 344 back and forth to permit appropriate tension on the fibrous material. Also, the roller 342 may be replaced by a bar arrangement which would permit the filaments of the fibrous material to be spread out on the bar, thereby permitting the thermosetting resin particles to further surround the filaments. Also, there may be multiple bars that can take the place of roll 342 variously placed in the immersion tank of chamber 332. Further, utilization of ultrasonic equipment attached to either the rollers and/or the bars would permit further surrounding of the tow with the impregnation bath thereby improving the impregnation. The ultrasonic equipment causes movement of the fibers and the particles of thermosetting resin thereby increasing the impregnation of the fibrous material. The ultrasonic equipment is readily available in the industry, such as Sonicator ultrasonic equipment, commercially available from Heat Systems, Inc. of Farmingdale, N.Y., U.S.A.

When utilizing the apparatus shown in FIG. 25, the fibrous material passes from the immersion tank of chamber 332 through a die (shown in FIGS. 28 and 29) which will size the fibrous material. Shown in FIG. 25 is a heating chamber 346 which can control the temperature of the tow as it leaves the heated impregnation tank or chamber. In this case one may be able to dry the impregnated fibrous material to a particular aqueous medium content, in a controlled manner. The resulting fibrous material is then ready for take-up on take-up roll 360 after passing over introductory roller 358.

The tows impregnated through the use of the equipment heretofore described instead of being a collection of individual filaments take on the shape of a tape or sheet. Such tape or sheet can vary in size. Even if a narrow tape is prepared, the tape adheres well on a roller due to the tacky nature of the resulting impregnated fibrous material to an adjacent wrap which is laid next to it in a side-by-side relationship. The dissolved polymeric binding agent (previously described) assists in adhering the thermosetting resin particles to the filaments as well as within tows which comprise the tape. Due to the complete impregnation of the fibrous material with the impregnation bath, the resulting product is "drapable", that is, it has the ability to hang or stretch out loosely and is capable of being readily easily folded.

By having this drapable capability, the multiple tows now in the sheet-like form can be shaped to any desired configuration, such as in a die for forming a bulk head door of an aircraft. Once in the die, it can be molded at an appropriate temperature and pressure. Other aircraft end uses could be landing gear doors, cowl components, wing to body fairing, outboard ailerons, stabilizer tips, rudders, elevator wings, fuselage, and the like.

Since the apparatus that can be utilized to impregnate the fibrous material shown in FIG. 25 is relatively light, it can be affixed to an upright member 362 which is connected to a supporting stand 364.

Figure 26:
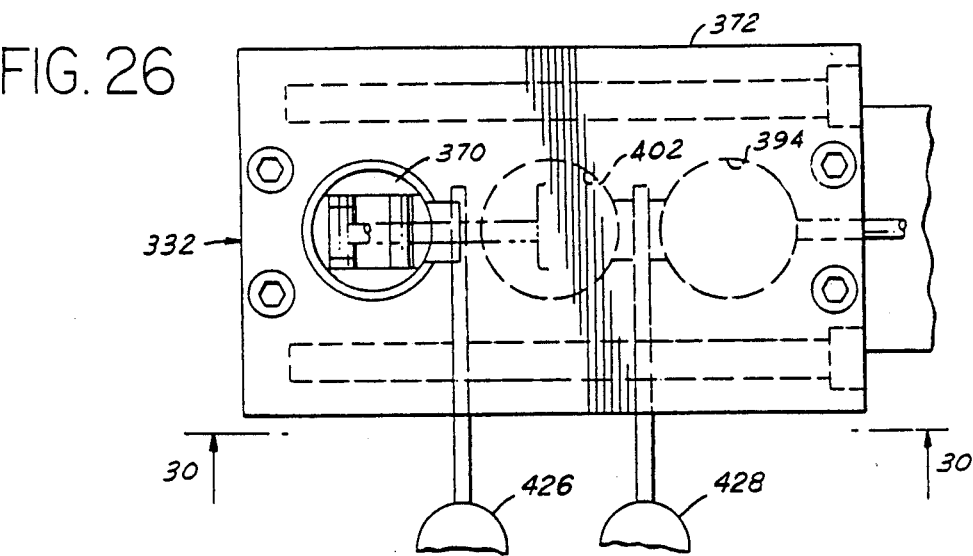
FIG. 26 is a top view of an immersion means useful in the present invention.
Figure 27:
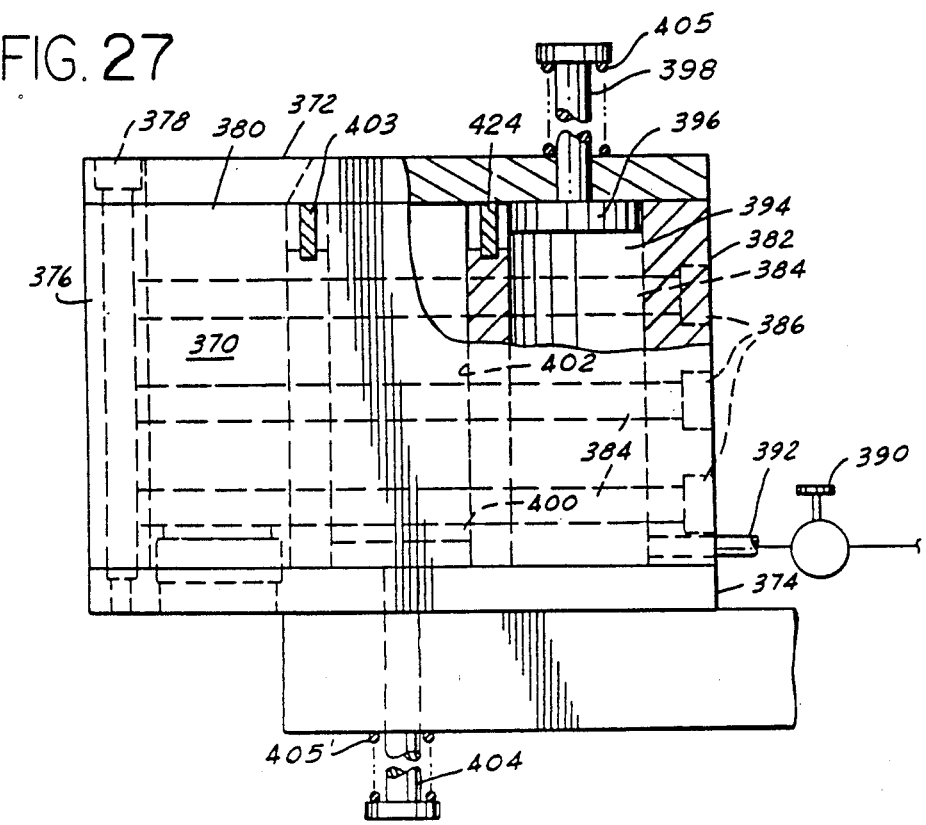
FIG. 27 is a front, partially sectional view of the apparatus of FIG. 26 taken along line 30—30 of FIG. 26.
Figure 28:
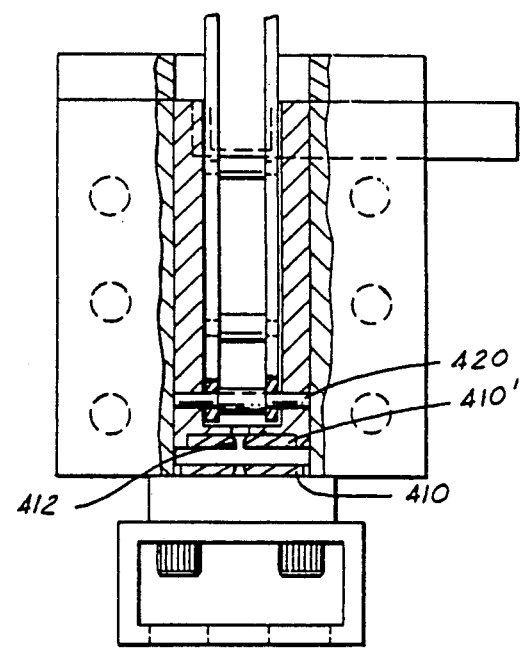
FIG. 28 is a side sectional view of the immersion means useful in the present invention.
Figure 29:
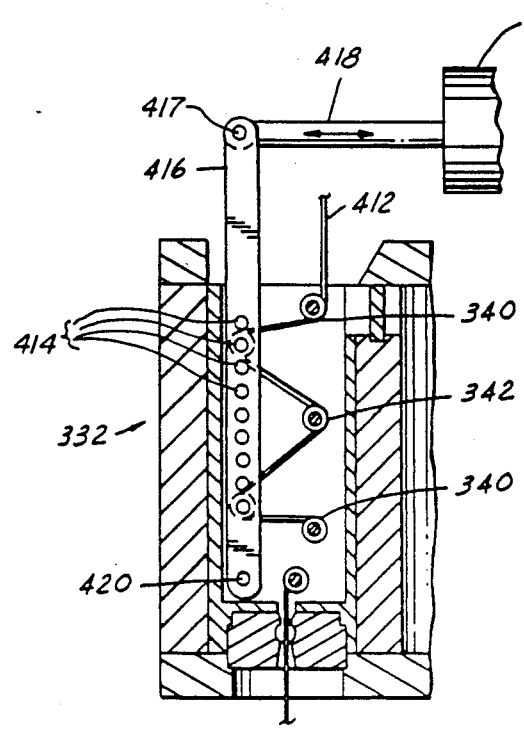
FIG. 29 is a sectional view of the immersion means useful in the present invention.

Since some of the thermosetting resins that may be useful in the present process are expensive, it has been found to be desirable to retain the impregnation bath that is applied to the tow in an immersion tank or chamber that has multiple chambers such as that shown in FIG. 26, which is a top view of the chamber 332. Shown on the left side of the apparatus is the chamber 370 in which the impregnation bath 338 is retained. The chamber comprises a top member 372 and a bottom member 374 which are bolted together by threaded fastener means 376 and 378 with the face means 380, best shown in FIG. 27, having the sides 382 secured by similar fastening members 384 and 386. Basically, the operation of the multi-chambered immersion tank or chamber permits the impregnation bath used to impregnate the fibrous material, to be pumped through pump 390 through inlet 392 into a first reservoir 394. A piston having a head 396 is pressed down through the chamber 394 by a handle or rod 398. A conduit 400 connects the reservoir 394 with reservoir chamber 402. The handle 398 is biased open by spring 405. The material that is present in chamber 402 can be passed into the contact chamber 370 by means of piston rod 404 which acts similar to piston rod 398 in the first reservoir chamber. In this fashion, the impregnation bath is maintained at an appropriate level by means of weir 403 which serves to connect and disconnect the chambers 394 and 402. Shaping die 410 is best shown in FIG. 28 which is comprised of aligned aperture 412 in cooperating elements 410 and 410'.

To facilitate the appropriate tension within the chamber 332 the rollers 340 may have cooperating bars or rollers 414 placed on a manifold 416 which can be adjusted to a desired tension by movement of bar member 418 which pivots at point 417. Use of ultrasonic techniques can likewise be applied to manifold 416 as could be applied to the bar that could take the place of roller 342 as discussed previously. Bar 418 would in turn be attached to servomotor 420 for frequent movement of the bar and manifold about pivot 417 as desired. Weir 424 operates in a similar fashion to weir 403 and are movable in and out of position by means of handles 426 and 428, respectively. The weirs can be slid in and out of position to permit the material to flow from one chamber to the other and into the immersion tank or chamber 370. The rod 404 is biased open by spring 405'.

The following examples are presented as specific illustrations of the claimed invention. It should be understood, however, that the invention is not limited to the specific details set forth in the examples.

EXAMPLE I

An alkyl phenoxypolyethoxy ethanol surfactant in a quantity of 2.5 grams is dissolved in 3362 grams of distilled water and combined at ambient temperature conditions with an aqueous dispersion of 750 grams of solid particles of M-100 PMR-15 polyimide thermosetting resin in 780 grams of water. The M-100 PMR-15 polyimide thermosetting resin is of the reverse Diels-Alder type and is commercially available from Hysol Grafil, Cleveland, Ohio, U.S.A., and is fully imidized as purchased. Once this polyimide resin is postcured via an addition crosslinking reaction its glass transition temperature is typically approximately 321° C. The particles of M-100 PMR-15 polyimide thermosetting resin have been ground to a mean particle size of 4.8 microns, with the largest particle size being approximately 24 microns. The surfactant is commercially available from Rohm and Haas Company as Triton X100 surfactant.

38 grams of solid particles of water-soluble polyacrylic acid binding agent possessing a molecular structure which is cross-linked with polyalkenyl polyether are slowly added to an agitated bath of the aqueous powder dispersion mentioned above. The water-soluble binding agent is commercially available from B.F. Goodrich as Grade 941 Carbopol polymer and has a molecular weight of approximately 1,250,000.

Mixing is conducted for two hours in order to completely dissolve the water-soluble binding agent and to disperse the particles of M-100 PMR-15 polyimide thermosetting resin. The pH of the resulting dispersion is found to be 3.2. The viscosity of the dispersion is found to be 160,000 cps. when measured with a Rheometrics Stress Rheometer (Model RSR/M) while operating at a shear rate of 0.01 reciprocal second. This viscosity is accompanied by a high shear-thinning behavior which enables good dispersion of the particles of thermosetting resin while being agitated. The Brookfield Yield Value of the dispersion is found to be 70 dynes/cm.$^2$ when tested on a Brookfield RVT viscometer as previously described.

70 grams of a 9.3 percent ammonium hydroxide solution are then added to the moderately agitated dispersion. This raises the pH of the dispersion to 7.5 to form an improved gelled impregnation bath wherein the viscosity of the resulting bath is substantially increased to approximately 1,200,000 cps. as measured with a Rheometrics Stress Rheometer (Model RSR/M) at a shear rate of 0.01 reciprocal second through an extension of the molecules of the dissolved binding agent. The resulting impregnation bath exhibits plastic flow with shear-thinning behavior. The Brookfield Yield Value of the dispersion is found to be 360 dynes/cm.$^2$ when tested on a Brookfield RVT viscometer as previously described. It can be calculated as previously described that the Minimum Brookfield Yield Value required to suspend the largest particles of M-100 PMR-15 thermosetting polyimide resin present in the dispersion is 4.1 dynes/cm.$^2$. Accordingly, the resulting impregnation bath is highly stable and the actual Brookfield Yield Value exceeds the calculated Minimum Brookfield Value to suspend even the largest M-100 PMR-15 polyimide thermosetting resin particles present by more than 85 times.

The resulting impregnation bath is next poured into an impregnation apparatus similar to that illustrated in FIG. 25 containing several stationary non-rotating bars immersed within the bath.

A tow of approximately 12,000 substantially continuous Celion carbon filaments in unsized form available from BASF Structural Materials, Inc., under the designation G30-500 is selected to serve as the fibrous reinforcement. The filaments of the tow possess a diameter of approximately 7 microns. This tow is fed in the direction of its length from a single bobbin located on a tension controlled creel, and while under tension, is passed through the impregnation bath while in contact with the stationary non-rotating bars immersed in the bath. Following passage over the bars the multifilamentary tow is passed through a rectangular metallic die having polished surfaces situated at the bottom of the impregnation bath. While passing over the bars and through the die, the substantially parallel carbon filaments are impregnated with the impregnation bath as the bath is caused to flow between the adjoining filaments. Such flow inherently results in a significant reduction in the viscosity of the impregnation bath which greatly aids in the incorporation of the solid M-100 PMR-15 polyimide thermosetting resin particles between the carbon filaments. Once the flow is discontinued the M-100 PMR-15 thermosetting resin particles tend to be locked within the fibrous material in a highly uniform manner. The die also aids in the control of the width and thickness of the resulting impregnated tow.

The resulting impregnated tow is next wound on a rotating drum using a transversing laydown guide to form a rectangular sheet having a width of approximately 30.5 cm.

It is found that the resulting sheet product following drying for two hours at ambient conditions to remove a portion of the water contains approximately 30.1 percent carbon fibers by weight, approximately 13.2 percent solid M-100 PMR-15 polyimide thermosetting resin particles by weight, approximately 0.7 percent ammonium polyacrylate binding agent having stiffened molecules possessing a cross-linked molecular structure by weight, and approximately 56 percent water by weight. This product contains the matrix-forming M-100 PMR-15 thermosetting resin particles substantially uniformly dispersed between adjoining fibers in the absence of fusion bonding and can be handled without the segregation of the particles. When tested in accordance with the drape test of ASTM D-1388, the product is found to be highly drapeable both in the 0° and 90° directions and to exhibit a flexural rigidity of approximately 10,000 mg.·cm. Also, the product is tacky and is found to pass the tack test of NASA Technical Bulletin 1142.

Next, the product while in a flat configuration is allowed to substantially completely dry to a water content of approximately 2 percent while at ambient conditions, and contains the M-100 PMR-15 thermosetting resin particles well bound therein. Ten flat plies containing 31.6 percent by weight of the M-100 PMR-15 thermosetting resin particles measuring approximately 10.2 cm.×10.2 cm. are laid up in the 0° direction in a matched metal mold at room temperature conditions and placed in a platen press. The mold is heated to 275° C. with no applied pressure. Once this temperature is achieved, a pressure of 2.1 MPa is applied. The mold is then held at these conditions for approximately 30 minutes, after which the mold is heated up to 300° C. and held for another 30 minutes. The thermosetting resin is substantially completely cured to form the matrix phase. The press is then turned off, thereby allowing the mold to slowly cool under 2.1 MPa pressure. Once the mold cools to 50° C., it is removed from the press and the resulting composite article in the form of a panel is removed from the mold. The resulting panel is postcured for 13 hours at 315° C. in a circulating air oven. It is then allowed to cool slowly to ambient temperature.

Alternatively, it would be possible to lay up the impregnated fibrous material prior to drying while still in the wet, tacky form. Under such conditions the open mold, containing the plies, could initially be heated to approximately 120° to 150° C. for approximately 1 hour in the absence of pressure, to further assist in the removal of volatiles. Such procedure would be particularly advantageous when forming a composite article of a more complex configuration, wherein drape and tack are of greater importance.

The resulting panel formed from the impregnated product, which is dried prior to placing in the mold, has a thickness of 0.154±0.001 cm., a theoretical carbon fiber volume of 61.2 percent, and a void content of less than 1.5 percent.

Test specimens are cut from panels, molded in the above described manner and four point, 0° flexural tests are conducted in accordance with ASTM D790-84a, Method II, Procedure A, using a span-to-depth ratio of approximately 32:1 and a crosshead speed of approximately 0.5 cm./minute, and 90° tensile tests are conducted in accordance with the procedure of ASTM D3039. A 0° flexural strength of 1550 MPa is exhibited, which represents a 66 percent translation of that theoretically attainable. A 0° flexural modulus of 122 GPa is exhibited, which represents an 86 percent translation of that theoretically attainable. A 90° tensile strength of 40 MPa is exhibited which represents a 72 percent translation of that theoretically attainable. Such 90° tensile strength value evidences superior adhesion between the carbon fibers and the matrix formed upon the substantially complete curing of the thermosetting resin.

EXAMPLE II

An alkyl phenoxypolyethoxy ethanol surfactant in a quantity of 0.75 grams is dissolved in 1230 grams of distilled water and combined at ambient temperature conditions with 223 grams of solid particles of a modified 5250-2 poly(bismaleimide) thermosetting resin formed in accordance with the teachings of U.S. Pat. No. 4,644,039. The modified 5250-2 poly(bismaleimide) thermosetting resin is supplied by BASF Aktiengesellschaft of Ludwigshafen, West Germany and is advanced to produce a melting temperature of approximately 70° to 80° C. and a gel time of approximately 10 minutes at 160° C. Since the thermosetting resin is a solid at room temperature, it can be ground to powder form. Once this modified 5250-2 poly(bismaleimide) thermosetting resin is postcured, its glass transition temperature is typically approximately 321° C. The particles of poly(bismaleimide) thermosetting resin have been ground to a mean particle size of 25 microns, with the largest particle size being 130 microns. The surfactant is commercially available from Rohm and Haas Company as Triton X100 surfactant.

10 grams of solid particles of water-soluble polyacrylic acid binding agent possessing a molecular structure which is cross-linked with polyalkenyl polyether are slowly added to an agitated bath of the aqueous powder dispersion mentioned above. The water-soluble binding agent is commercially available from B.F. Goodrich as Grade 941 Carbopol resin and has a molecular weight of approximately 1,250,000.

Mixing is conducted for two hours in order to completely dissolve the water-soluble binding agent and to disperse the particles of poly(bismaleimide) thermosetting resin. The pH of the resulting dispersion is found to be 3.7. The viscosity of the dispersion is found to be 120,000 cps. when measured with a Rheometrics Stress Rheometer (Model RSR/M) while operating at a shear rate of 0.01 reciprocal second. This viscosity is accompanied by a high shear-thinning behavior which enables good dispersion of the particles of thermosetting resin. The Brookfield Yield Value of the dispersion is found to be 45 dynes/cm.$^2$ when tested on a Brookfield RVT viscometer as previously described.

20 grams of a 9.3 percent ammonium hydroxide solution are then added to the moderately agitated dispersion. This raises the pH of the dispersion to 7.0 to form an improved gelled impregnation bath wherein the viscosity of the resulting bath is substantially increased to approximately 900,000 cps. when measured with a Rheometrics Stress Rheometer (Model RSR/M) at a shear rate of 0.01 reciprocal second through an extension of the molecules of the dissolved binding agent. The resulting impregnation bath exhibits plastic flow with shear-thinning behavior. The Brookfield Yield Value of the dispersion is found to be 280 dynes/cm.$^2$ when tested on a Brookfield RVT viscometer as previously described. It can be calculated as previously described that the Minimum Brookfield Yield Value required to suspend the largest particles of the poly(bismaleimide) thermosetting resin present in the dispersion is 10.9 dynes/cm.$^2$. Accordingly, the resulting impregnation bath is highly stable and the actual Brookfield Yield Value exceeds the calculated Minimum Brookfield Value to suspend even the largest poly(bismaleimide) thermosetting resin particles present by more than 25 times.

The resulting impregnation bath is next poured into an impregnation apparatus similar to that illustrated in FIG. 25 containing several stationary non-rotating bars immersed within the bath.

A tow of approximately 12,000 substantially continuous Celion carbon filaments in unsized form available from BASF Structural Materials, Inc., under the designation G30-500 is selected to serve as the fibrous reinforcement. The filaments of the tow possess a diameter of approximately 7 microns. This tow is fed in the direction of its length from a single bobbin located on a tension controlled creel, and while under tension, is passed through the impregnation bath while in contact with the stationary non-rotating bars immersed in the bath. Following passage over the bars the multifilamentary tow is passed through a rectangular metallic die having polished surfaces situated at the bottom of the impregnation bath. While passing over the bars and through the die the substantially parallel carbon filaments are impregnated with the impregnation bath as the bath is caused to flow between the adjoining filaments. Such flow inherently results in a significant reduction in the viscosity of the impregnation bath which greatly aids in the incorporation of the solid poly(bismaleimide) thermosetting resin particles between the carbon filaments. Once the flow is discontinued the poly(bismaleimide) thermosetting resin particles tend to be locked within the fibrous material in a highly uniform manner. The die also aids in the control of the width and thickness of the resulting impregnated tow.

The resulting impregnated tow is next wound on a rotating drum using a transversing laydown guide to form a rectangular sheet having a width of approximately 30.5 cm.

It is found that the resulting sheet product following drying for two hours at ambient conditions to remove a portion of the water contains approximately 29.7 percent carbon fibers by weight, approximately 14.6 percent solid poly(bismaleimide) thermosetting resin particles by weight, approximately 0.7 percent ammonium polyacrylate binding agent having stiffened molecules possessing a cross-linked molecular structure by weight, and approximately 55 percent water by weight. This product contains the matrix-forming poly(bismaleimide) thermosetting resin particles substantially uniformly dispersed between adjoining fibers in the absence of fusion bonding and can be handled without the segregation of the particles. When tested in accordance with the drape test of ASTM D-1388 the product is found to be highly drapeable both in the 0° and 90° directions and to exhibit a flexural rigidity of approximately 10,000 mg.-cm. Also, the product is tacky and is found to pass the tack test of NASA Technical Bulletin 1142.

Next, the product while in a flat configuration is allowed to substantially completely dry to a water content of approximately 2 percent while at ambient conditions, and contains the poly(bismaleimide) thermosetting resin particles well bound therein. Ten flat plies containing 34.0 percent by weight of the poly(bismaleimide) thermosetting resin particles, measuring approximately 10.2 cm.×10.2 cm. are laid up in the 0° direction in a matched metal mold at room temperature conditions and placed in a platen press. The mold is heated to 150° C. with no applied pressure, at a rate of 1.5° C./minute. Once this temperature is achieved, a pressure of 1.4 MPa is applied. The mold is then held at these conditions for approximately 60 minutes, after which the mold is heated up to 180° C. and held for another 6 hours. The thermosetting resin is substantially completely cured to form the matrix phase. The press is then turned off thereby allowing the mold to slowly cool under 1.4 MPa pressure. Once the mold cools to 50° C. it is removed from the press and the resulting composite article in the form of a panel is removed from the mold. The resulting panel is postcured for 12 hours at 230° C. in a circulating air oven. It is then allowed to cool slowly to ambient temperature.

Alternatively, it would be possible to lay up the impregnated fibrous material prior to drying while still in the wet, tacky form. Under such conditions the open mold, containing the plies, could initially be heated to approximately 40° to 50° C. for approximately 2 hours in a vacuum oven to further assist in the removal of volatiles. Such procedure would be particularly advantageous when forming a composite article of a more complex configuration, wherein drape and tack are of greater importance.

The resulting panel formed from the impregnated product, which is dried prior to placing in the mold, has a thickness of 0.180±0.001 cm., a theoretical carbon fiber volume of 57.5 percent, and a void content of less than 1.5 percent.

Test specimens are cut from panels, molded in the above described manner, and four point, 0° flexural tests are conducted in accordance with ASTM D790-84a, Method II, Procedure A, using a span-to-depth ratio of approximately 32:1 and a crosshead speed of approximately 0.5 cm./minute, and 90° tensile tests are conducted in accordance with ASTM D3039. A 0° flexural strength of 1500 MPa is exhibited, which represents a 67 percent translation of that theoretically attainable. A 0° flexural modulus of 122 GPa is exhibited, which represents a 92 percent translation of that theoretically attainable. A 90° tensile strength of 41 MPa is exhibited which represents a 65 percent translation of that theoretically attainable. Such 90° tensile strength value evidences superior adhesion between the carbon fibers and the matrix formed upon the substantially complete curing of the thermosetting resin.

Although the invention has been described with preferred embodiments, it is to be understood that variations and modifications may be employed without departing from the concept of the invention as defined in the following claims.

We claim:

1. An improved preimpregnated fibrous material suitable for the formation of a fiber-reinforced composite article, said preimpregnated fibrous material comprising (a) a plurality of adjoining substantially parallel reinforcing filaments and, substantially uniformly dispersed between adjoining filaments in the absence of fusion bonding, (b) an effective amount of a polymeric water-soluble binding agent, (c) aqueous medium, and (d) solid particles of thermosetting resin, said (b), (c) and (d) having been derived from a dispersion having a viscosity specifically selected to provide a preimpregnated fibrous material which inherently (1) is drapable and tacky at ambient conditions, (2) is handleable without segregation of said particles within the fibrous material and (3) capable upon the application of heat and pressure of being transformed into a substantially void-free composite article of a predetermined configuration wherein said thermosetting resin is substantially completely cured and forms the matrix phase.

2. The improved fibrous material in accordance with claim 1 wherein said plurality of adjoining substantially parallel reinforcing filaments are provided as a single end.

3. The improved fibrous material in accordance with claim 1 wherein said fibrous material comprises a plurality of ends each comprising a plurality of substantially parallel reinforcing filaments.

4. The improved fibrous material in accordance with claim 1 wherein said fibrous material is in the configuration of a cloth which incorporates a plurality of ends each comprising a plurality of substantially parallel reinforcing filaments.

5. The improved fibrous material in accordance with claim 1 wherein said reinforcing filaments are selected from the group consisting of carbon, glass, aramid, silicon carbide, silicon nitride, boron nitride, and mixtures of the foregoing.

6. The improved fibrous material in accordance with claim 1 wherein said reinforcing filaments are carbon filaments.

7. The improved fibrous material in accordance with claim 1 wherein said reinforcing filaments are glass filaments.

8. The improved fibrous material in accordance with claim 1 wherein said solid particles of thermosetting resin are selected from the group consisting of phenolic resins, polyester resins, melamine formaldehyde resins, urea-formaldehyde resins, casein-formaldehyde resins, polyimide resins, polyurethane resins, epoxy resins, diallyl phthalate resins, vinyl ester resins, polybutadiene(1,2) resins, cyanate ester resins, and cyanamide resins.

9. The improved fibrous material in accordance with claim 1 wherein said solid particles of thermosetting resin are polyimide resin.

10. The improved fibrous material in accordance with claim 9 wherein said solid particles of thermosetting resin are a reverse Diels-Alder polyimide resin which is substantially fully imidized and is capable of undergoing an addition crosslinking reaction in the substantial absence of the generation of volatile by-products.

11. The improved fibrous material in accordance with claim 9 wherein said particles of thermosetting resin are poly(bismaleimide) resin.

12. The improved fibrous material in accordance with claim 1 wherein said solid particles of thermosetting resin possess a particle size within the range of approximately 0.1 to 100 microns.

13. The improved fibrous material in accordance with claim 1 wherein said binding agent is polyacrylic acid having stiffened molecules possessing a cross-linked molecular structure.

14. The improved fibrous material in accordance with claim 1 wherein said binding agent is an ammonium or alkyl ammonium polyacrylate binding agent having stiffened molecules possessing a cross-linked molecular structure.

15. The improved fibrous material in accordance with claim 1 wherein the concentration of aqueous medium within said fibrous material is within the range of approximately 10 to 70 percent by weight.

16. The improved fibrous material in accordance with claim 1 wherein said solid particles of thermosetting resin are present in a concentration of approximately 12 to 45 percent by weight.

17. The improved fibrous material in accordance with claim 1 wherein said plurality of adjoining substantially parallel reinforcing filaments (a) are present in a concentration of approximately 15 to 55 percent by weight, said polymeric water-soluble binding agent (b) is present in a concentration of approximately 0.02 to 2.2 percent by weight, said aqueous medium (c) is present in a concentration of approximately 10 to 70 percent by weight, and said solid particles of thermosetting resin (d) are present in a concentration of approximately 6 to 45 percent by weight.

18. The improved fibrous material in accordance with claim 1 wherein said drapable character is evidenced by a flexural rigidity of less than 15,000 mg.·cm. when tested in accordance with ASTM D1388.

19. The improved fibrous material in accordance with claim 1 which passes the tack test of NASA Technical Bulletin 1142.

20. The improved fibrous material in accordance with claim 1 which upon the application of heat and pressure can be transformed into a substantially void-free composite article which exhibits a zero degree flexural strength of at least 60 percent of the theoretical maximum when tested in accordance with ASTM D790.

21. The improved fibrous material in accordance with claim 1 which upon the application of heat and pressure can be transformed into a substantially void-free composite article which exhibits a zero degree flexural modulus of at least 80 percent of the theoretical value when tested in accordance with ASTM D790.

22. The improved fibrous material in accordance with claim 1 which upon the application of heat and pressure can be transformed into a substantially void-free composite article which exhibits a 90° tensile strength of at least 60 percent of the theoretical value when tested in accordance with ASTM D3039.

23. The improved fibrous material in accordance with claim 1 which upon the application of heat and pressure can be transformed into a substantially void-free composite article which exhibits a 90° tensile strength of at least 80 percent of the theoretical value when tested in accordance with ASTM D3039.

* * * * *